United States Patent
Patel et al.

(10) Patent No.: US 11,164,202 B2
(45) Date of Patent: Nov. 2, 2021

(54) AUTOMOBILE DEALER REFERRAL AND REWARDS SERVICE

(71) Applicant: ExaltAuto Inc., LLC, Chapel Hill, NC (US)

(72) Inventors: Dharmesh Ratilal Patel, Chapel Hill, NC (US); Hardik Ratilal Patel, San Jose, CA (US)

(73) Assignee: ExaltAuto Inc., LLC, Chapel Hill, NC (US)

( * ) Notice: Subject to any disclaimer, the term of this patent is extended or adjusted under 35 U.S.C. 154(b) by 0 days.

(21) Appl. No.: 16/256,704

(22) Filed: Jan. 24, 2019

(65) Prior Publication Data

US 2020/0242647 A1    Jul. 30, 2020

(51) Int. Cl.
*G06Q 30/02* (2012.01)
*G06Q 20/02* (2012.01)

(52) U.S. Cl.
CPC ....... *G06Q 30/0214* (2013.01); *G06Q 20/023* (2013.01); *G06Q 30/0225* (2013.01)

(58) Field of Classification Search
CPC ............. G06Q 30/0214; G06Q 20/023; G06Q 30/0225
USPC ...................................................... 705/14.16
See application file for complete search history.

(56) References Cited

FOREIGN PATENT DOCUMENTS

KR          101351352 B1 *  1/2014

OTHER PUBLICATIONS

Jackie Charniga, Tell a friend, but do it online, 2017 (Year: 2017).*
Visakan Veerasamy, Choosing Your Referral Program Incentives, 2015 (Year: 2015).*

* cited by examiner

Primary Examiner — Tarek Elchanti
(74) Attorney, Agent, or Firm — NK Patent Law

(57) ABSTRACT

An automobile dealer referral and rewards service allows users to recommend automobile dealers to one another through referral links. If the referral ends up buying an automobile from the dealer, the referring user receives a monetary reward through the system, which is paid for by the dealer who received the referral and made the purchase.

14 Claims, 21 Drawing Sheets

AUTOMOBILE DEALER REFERRAL AND REWARDS SERVICE

TECHNICAL FIELD

Embodiments described herein relate generally to systems and methods for a dealer referral and rewards service to provide referral links between dealers and buyers, and to provide monetary rewards or other types of rewards for providing referrals that lead to a purchase, using mobile devices and/or computer systems connected over a network.

BACKGROUND

Digital and online advertising are popular for many automobile dealers, but consumers have, in many instances, become unreceptive to automobile-dealership advertising and are likely to dismiss the message. As a result, automobile dealerships (both consumer and commercial) often rely on word-of-mouth marketing for finding new potential buyers. Salespeople at automobile dealerships frequently use their personal networks for leads to potential buyers. In many cases, a significant portion of business for a seasoned automobile salesperson comes from referrals from satisfied first-time buyers, their relatives, their friends, their neighbors, etc. Managing the landscape of referrals and potential leads can be challenging for even the best-equipped salesperson.

Currently available ways of managing referrals and leads often lack a personal connection, which can be valuable to converting high-yield referrals, leads, and inquiries into purchases (and, hopefully, long-term repeat customers). In addition, the currently available ways of managing referrals and leads lack a rewards system, meaning that there is no strong incentive for customers to provide valuable word-of-mouth advertising.

In addition, many buyers express frustration with the "last-mile" of the sale, where they believe they have already negotiated everything relevant to the purchase, but then they end up being sold further add-ons after they thought the deal was done, such as extended warranties, maintenance plans, financing specifics, etc.

Accordingly, a need exists for a platform that enables automobile dealerships and/or salespeople to position themselves in front of potential buyers as the only credible source that a buyer considers when thinking about a new/used automobile purchase and that provides rewards to customers who provide valuable referrals to the dealers and/or salespeople. A need further exists for a system that allows buyers to know the final, out-the-door price, with all extras priced in, before they agree to the deal.

SUMMARY

The present invention provides a dealer referral and rewards service that allows salespeople to connect with potential buyers through personal relationships and provide targeted offerings to the potential buyers that provide for a much more favorable potential of converting the interest into a sale. The dealer referral and rewards service offers a unique rewards system to users that allows salespeople to expand their reach and thereby strengthen their brand. The dealer referral and rewards service also provides credibility to the salespeople, which allows them to become a trusted professional for potential buyers. The dealer referral and rewards service further provides a way to streamline the amount of time and number of communications required in the process of buying an automobile by providing various package options with the final out-the-door price, which provides further credibility to the salesperson.

The dealer referral and rewards service allows for users to refer their friends and family to a particular salesperson with whom they have had a good experience. When a referral is made, the service creates a link between the dealer and the referral lead. The dealer and the referral lead may communicate about a purchase directly through the service—either through a web-based interface or a mobile app—to facilitate a purchase. If the referral lead ends up buying a car from the dealer, then the referring user earns a credit within the service, and that credit can be cashed out at any time, for money or other valuable rewards (e.g., gift cards, etc.).

According to one embodiment of the present invention, a method is disclosed for managing referrals and rewards for automobile sales. The method includes storing, in a database, user information associated with a plurality of users, wherein the plurality of users includes users of a first type and users of a second type. The method includes creating a first link between a first user and a second user, wherein the first user and the second user are users of the first type, and wherein the first link is represented as an association in the database that is stored as part of the user information associated with the first user and stored as part of the user information associated with the second user. The method includes creating a second link between the first user and a third user, wherein the third user is a user of the second type, wherein the second link is represented as an association in the database stored as part of the user information associated with the first user and stored as part of the user information associated with the third user, and wherein the second link is created in response to a suggestion from the second user. The method includes providing the first user with a product package offer from the third user, wherein the product package offer includes information associated with an automobile for sale and a purchase price for the automobile. The method includes upon completion of a purchase of the automobile by the first user, crediting an account of the second user with a reward, wherein the account is credited by storing the reward in the database as part of the user information associated with the second user. The method includes transferring the reward to the second user.

According to one embodiment of the method for managing referrals and rewards for automobile sales, the first type of user is a potential automobile buyer.

According to one embodiment of the method for managing referrals and rewards for automobile sales, the second type of user is an automobile seller.

According to one embodiment of the method for managing referrals and rewards for automobile sales, the reward is transferred to the second user using an ACH transfer.

According to one embodiment of the method for managing referrals and rewards for automobile sales, the completion of the purchase of the automobile is verified using a verification process that includes receiving a verification of the purchase from the first user, receiving a verification of the purchase from the third user, and receiving a verification of the purchase from an automobile dealership from which the purchase was made.

According to one embodiment, the method for managing referrals and rewards for automobile sales further includes hosting a communication channel between the first user and the third user to allow communication between the first user and the third user, wherein the communication channel is established using the user information associated with the first user and the user information associated with the third user.

According to one embodiment of the present invention, a server for managing referrals and rewards for automobile sales is disclosed. The server includes a database configured to store user information associated with a plurality of users, the plurality of users including users of a first type and users of a second type. The server includes a processor configured to create a first link between a first user and a second user, wherein the first user and the second user are users of the first type, and wherein the first link is represented as an association in the database that is stored as part of the user information associated with the first user and stored as part of the user information associated with the second user. The processor of the server is configured to create a second link between the first user and a third user, wherein the third user is a user of the second type, wherein the second link is represented as an association in the database stored as part of the user information associated with the first user and stored as part of the user information associated with the third user, and wherein the second link is created in response to a suggestion from the second user. The processor of the server is configured to provide the first user with a product package offer from the third user, wherein the product package offer includes information associated with an automobile for sale and a purchase price for the automobile. The processor of the server is configured to upon completion of a purchase of the automobile by the first user, credit an account of the second user with a reward, wherein the account is credited by storing the reward in the database as part of the user information associated with the second user. The processor of the server is configured to transfer the reward to the second user.

According to one embodiment, the server for managing referrals and rewards for automobile sales includes a messaging service that hosts a communication channel between users that allows communication between the first user and the third user, wherein the communication channel is established using the user information associated with the first user and the user information associated with the third user.

According to one embodiment, the server for managing referrals and rewards for automobile sales includes an image and video management service.

According to one embodiment of the server for managing referrals and rewards for automobile sales, the first type of user is a potential automobile buyer.

According to one embodiment of the server for managing referrals and rewards for automobile sales, the second type of user is an automobile seller.

According to one embodiment of the server for managing referrals and rewards for automobile sales, the reward is transferred to the second user using an ACH transfer.

According to one embodiment of the server for managing referrals and rewards for automobile sales, the processor is further configured to verify completion of the purchase of the automobile using a verification process that includes receiving a verification of the purchase from the first user, receiving a verification of the purchase from the third user, and receiving a verification of the purchase from an automobile dealership from which the purchase was made.

According to one embodiment of the present invention, a system for managing referrals and rewards for automobile sales is disclosed. The system includes a software application operable on a device of a first user, wherein the first user is a user of a first type. The system includes a software application operable on a device of a second user, wherein the second user is a user of the first type. The system includes a software application operable on a device of a third user, wherein the third user is a user of a second type. The system includes a server that includes a processor configured to store, in a database, user information associated with a plurality of users, wherein the plurality of users includes users of the first type and users of the second type. The processor of the server is configured to create a first link between the first user and the second user, wherein the first link is represented as an association in the database that is stored as part of the user information associated with the first user and stored as part of the user information associated with the second user. The processor of the server is configured to create a second link between the first user and the third user, wherein the second link is represented as an association in the database stored as part of the user information associated with the first user and stored as part of the user information associated with the third user, and wherein the second link is created in response to a suggestion from the second user. The processor of the server is configured to provide the first user with a product package offer from the third user, wherein the product package offer includes information associated with an automobile for sale and a purchase price for the automobile. The processor of the server is configured to upon completion of a purchase of the automobile by the first user, credit an account of the second user with a reward, wherein the account is credited by storing the reward in the database as part of the user information associated with the second user. The processor is configured to transfer the reward to the second user.

According to one embodiment of the system for managing referrals and rewards for automobile sales, the first type of user is a potential automobile buyer.

According to one embodiment of the system for managing referrals and rewards for automobile sales, the second type of user is an automobile seller.

According to one embodiment of the system for managing referrals and rewards for automobile sales, the reward is transferred using an ACH transfer.

According to one embodiment of the system for managing referrals and rewards for automobile sales, the processor of the server is further configured to verify the completion of the purchase of the automobile using a verification process that includes receiving a verification of the purchase from the first user, receiving a verification of the purchase from the third user, and receiving a verification of the purchase from a dealership from which the purchase was made.

According to one embodiment of the system for managing referrals and rewards for automobile sales, the processor of the server is further configured to host a communication channel between the first user and the third user to allow communication between the first user and the third user, wherein the communication channel is established using the user information associated with the first user and the user information associated with the third user.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings.

FIG. 21 depicts an example of a dealer user's Client Network screen on the mobile application of the dealer referral and rewards service.

FIG. 22 depicts an example of a dealer user's Add a Client screen on the mobile application of the dealer referral and rewards service.

FIG. 23 depicts an example of a dealer user's screen that allows the dealer to enter a package offer for a client on the mobile application of the dealer referral and rewards service.

FIG. 24 depicts an example of a dealer user's Walking Advertisements screen on the mobile application of the dealer referral and rewards service.

FIG. 25 depicts an example of a dealer user's screen for a particular walking advertisement on the mobile application of the dealer referral and rewards service.

FIG. 26 depicts an example of a dealer user's Add a Walking Advertisement screen.

FIG. 31 depicts an example of a user's Contact Us screen on the mobile application of the dealer referral and rewards service.

FIG. 32 depicts an example of a user's About Us screen on the mobile application of the dealer referral and rewards service.

DETAILED DESCRIPTION

Figure 1:
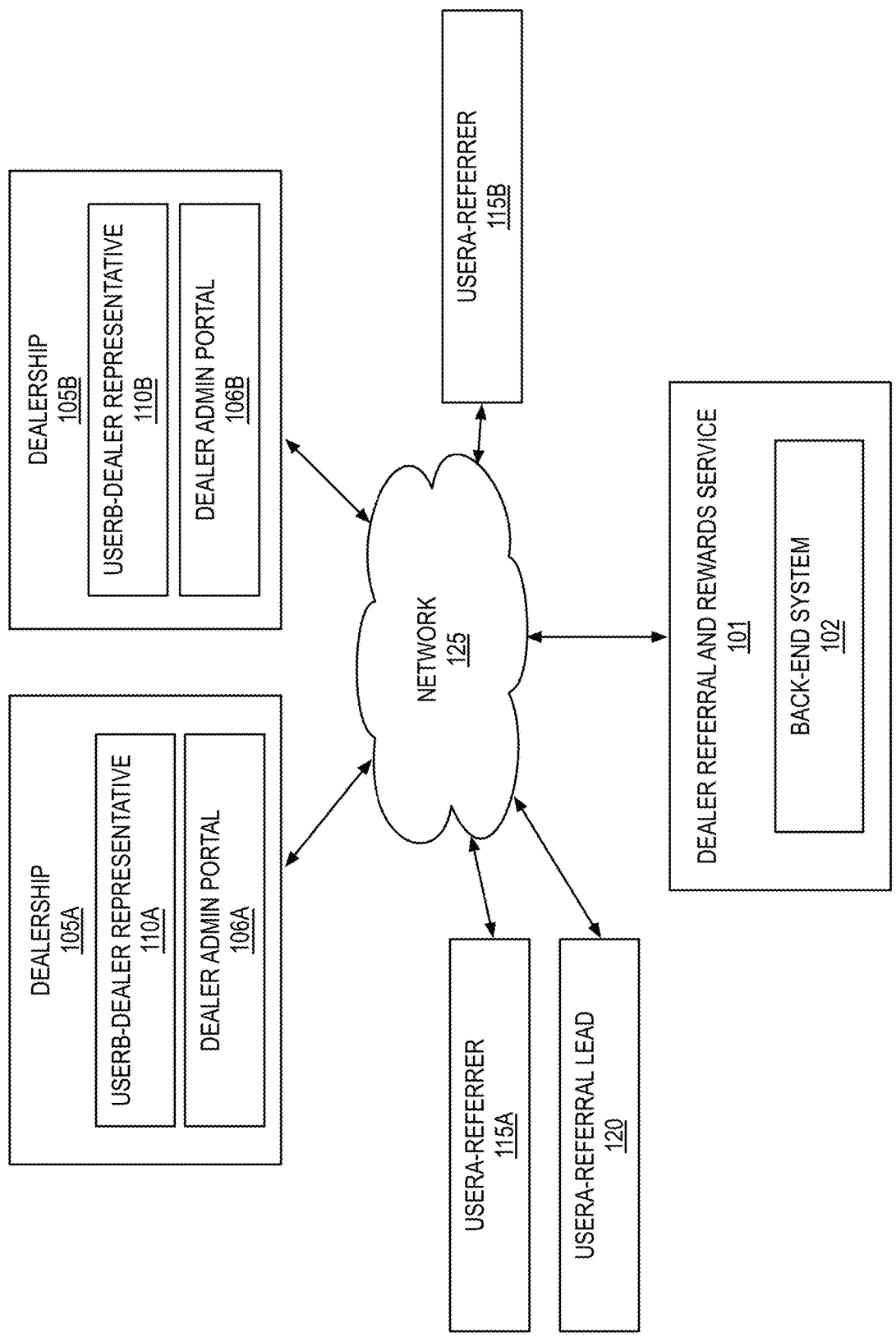
FIG. 1 depicts a system for managing referrals for automobile sales and providing a rewards system that pays rewards to users for providing referrals to automobile dealers using mobile devices and/or computer systems connected to a network.

The following description and figures are illustrative and are not to be construed as limiting. Numerous specific details are described to provide a thorough understanding of the disclosure. In certain instances, however, well-known or conventional details are not described in order to avoid obscuring the description. References to "one embodiment" or "an embodiment" in the present disclosure may be (but are not necessarily) references to the same embodiment, and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way.

Alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

As will be described in greater detail below with reference to the figures, the subject matter described herein provides new systems and methods for managing referrals for automobile sales and providing a rewards system that pays money or other valuable rewards to users for providing referrals to automobile dealers.

The dealer referral and rewards service includes various types of users. Some users are potential customers (e.g., people interested in buying a car). Some users are dealer representatives (e.g., salesperson working at a dealership or independent/freelance salesperson not working at a particular dealership). Some users are the dealerships themselves (e.g., a sales manager, general manager). A dealership may have multiple dealer representatives within the dealership who are part of the dealer referral and rewards service. The users of the service may be divided into two groups: (1) buyers (i.e., designated as UserA type users); and (2) sellers (i.e., designated as UserB type users). Buyers may include potential buyers who are actively looking to purchase an automobile, previous buyers who have previously purchased an automobile from a particular salesperson and/or a particular dealership that is part of the dealer referral and rewards service (either through the dealer referral and rewards service, or separately and then having later signed up for the service), and users who are not actively looking to purchase an automobile but may, at some time in the future, be interested. Sellers may include dealerships that are part of the dealer referral and rewards service as an entity, as well as individual dealer representatives (e.g., salespeople) who work for dealerships (including both dealerships that are part of the dealer referral and rewards service and dealerships that are not part of the dealer referral and rewards service).

The dealer referral and rewards service operates based on relationships (e.g., personal links) between users. Users of the service may be linked to one another to through personal links within the service. Personal links are similar to "friendships" in other social-networking environments; they differ, however, in that one user of the service can suggest a personal link between two other users. For example, when a buyer-type user (e.g., a UserA-type user) within the service has bought a car from a seller-type user within the service (e.g., UserB-type user), those two users may be linked to one another within the service. In addition, the buyer may be linked to the buyer's family, friends, and co-workers within the service. The buyer may further suggest a link between the buyer's friends (i.e., other UserA-type users) and the seller (i.e., UserB-type user). A link suggested by one buyer between another buyer and a seller is referred to as a "referral link" or a "referral lead".

As an example, if Mary buys a car from Bob (a salesperson at the local dealership), then Mary and Bob may establish a link to one another within the service. Later, when Mary's brother, Peter, asks Mary for a recommendation for a place to buy a car, Mary can send Peter a link to Bob through the service. The link connects Peter to Bob (as a referral link or referral lead) so that they can discuss a potential purchase. Bob is notified that he has been linked with Peter, which signals to Bob that Peter is a potential buyer.

If Peter ends up buying a car from Bob, then Mary earns a monetary reward within the service. Upon verification of Peter's purchase from Bob, the service generates a bill to the dealer for the referral link. Once the dealer has paid the bill to the service provider, the service credits Mary's account with a predetermined award that is a portion of what the dealer paid. Mary may then retrieve her reward at any time, at which point the service will send Mary a check.

Having a referral lead come through the service is beneficial for all parties to the potential transaction. It signals an existing relationship between the salesperson (i.e., dealer representative) and the potential buyer. It also signals to the dealer that the potential buyer is a valuable buyer since that buyer has become invested, at least to some extent, in this particular dealership and/or dealer representative.

Another benefit of the service is that it can eliminate the traditionally profitable "last-mile" portion of the sale, where the buyer is offered (and often pressured) to buy additional things, such as an extended warranty, a maintenance plan, etc., or where the buyer is offered financing, often at a rate that is higher than a bank rate. These last-miles sales generally occur after the deal has already been agreed upon, but it is often where car dealers make additional profit in a sale. These additional sales can create tension between the buyer and seller, and may degrade their relationship. By eliminating them, the service helps provide stronger relationships, which are beneficial for all parties in the long term.

Dealerships, dealer representatives, and/or users who want to use the dealer referral and rewards service may download a mobile application onto one or more mobile devices, or they may log in to the service through a web-based user interface from a web browser (e.g., Google Chrome, Firefox, Microsoft Internet Explorer, Apple Safari, etc.) on a computer or a mobile device. The dealership has a web-based user-interface that provides dashboard functionality, which allows the dealership to log into the service and see the state of deals being worked by the dealer representatives from that dealership.

The provider of the automobile dealer referral and rewards service has a web-based user-interface that provides visibility into all aspects of the data being managed within the service, including, for example, access to the database(s).

FIG. 1 depicts a system for managing referrals for automobile sales and providing a rewards system that pays rewards to users for providing referrals to automobile dealers using mobile devices and/or computer systems connected to a network.

Referring to FIG. 1, a dealer referral and rewards service 101 connects various users of the service 101 to each other. The users may include (1) one or more dealerships, such as dealership 105*a* and/or dealership 105*b*; (2) one or more dealer representatives, such as UserB—dealer representative 110a and UserB—dealer representative 110b, and (3) one or more buyers, such as UserA—referrer 115A and UserA—referral lead 120, over a network 125. The dealerships 105a and 105b may connect to the service 101 through dealer admin portals 106a and 106b. The dealer admin portals 106a and 106b may be implemented as a web-based user interface that can be accessed through a computer at dealerships 105a and 105b.

Dealerships may include any type of automobile dealership. Dealer representatives may include salespeople, managers, service employees, or other employees of a dealership (but they will generally be salespeople). The dealer representatives may be full-time employees of the dealership or may be hired on a consulting/freelance basis. Users may include anybody interested in using the dealer referral and rewards service, including, for example, people shopping for a new automobile, people who have previously purchased an automobile from a dealership/dealer that is part of the dealer referral and rewards service, people who are related to or acquainted with people who work at a dealership that is part of the dealer referral and rewards service.

The dealer referral and rewards service 101 may be comprised of a back-end system 102 that provides processing for the service 101. The back-end system 102 may be implemented in one computer, or in multiple computers that are communicatively connected to one another (e.g., over network 125). An exemplary architecture of back-end system 102 is further described in FIG. 3.

The network 125 may be any type of network or any combination of networks, including, for example, the Internet, a wireless cellular network, a wireless network (e.g., 802.11 Wi-Fi), a Bluetooth network, or any other type of network over which computers and/or mobile device can communicate.

Figure 2:
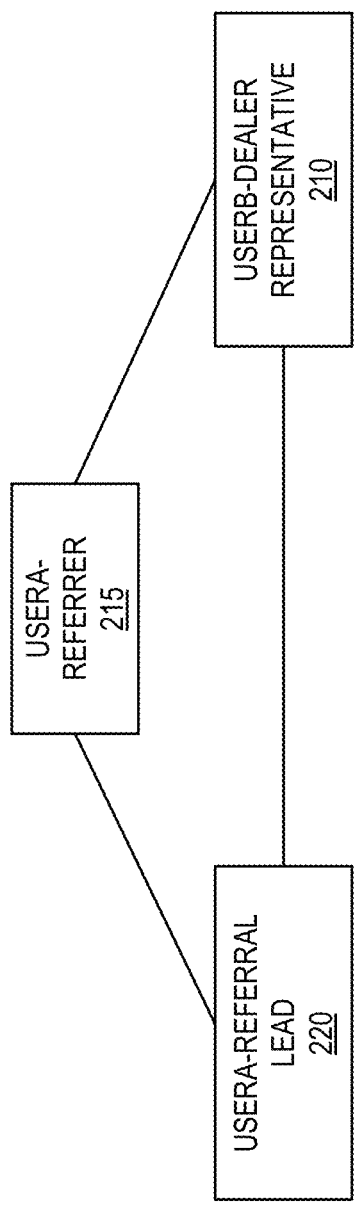
FIG. 2 depicts a relationship between the different types of users in the dealer referral and rewards service.

FIG. 2 depicts a relationship between the different types of users in the dealer referral and rewards service.

Referring to FIG. 2, the dealer referral and rewards service maintains a linked relationship (e.g., a triangular linking) between and among various users. In one embodiment, a three-way relationship between the users exists between UserA—referrer 215, a UserA—referral lead 220, and UserB—dealer representative 210. The dealer referral and rewards service described herein relies on personal links (i.e., relationships) between users for dealer referrals. A personal link associates one user with one another user and allows associated/linked users to share dealer referrals with one another. When a dealer referral leads to a successful purchase, the referring user earns a reward within the system. The reward may be tracked in the system using dollars or another form of reward points. In the case of dollars, the dealer referral and rewards service maintains a balance for each user, and a user may cash out their balance at any time.

A user may refer another user to a dealer that the referring user is linked to. For example, as shown in FIG. 2, UserA—referrer 215 may have an established link to UserB—dealer representative 210 as a result of a previous automobile purchase that the referring user bought from the dealer representative. UserA—referrer 215 may send a referral link to UserA—referral lead 220 to establish a link between UserA—referral lead 220 and UserB—dealer representative 210. In some embodiments, UserA—referrer 215 may have already had a personal link to UserA—referral lead 220 (e.g., they may be friends or co-workers). In other embodiments, there may not have been an existing personal link between UserA—referrer 215 and UserA—referral lead 220. In some embodiments, the UserB-dealer representative 210 may receive a notification when the referral is sent from UserA—referrer 215 to UserA—referral lead 220. When the referral link is established between UserA—referral lead 220 and UserB—dealer representative 210, that information is stored in a database or other memory in the back-end system. The link may be stored as part of user information associated with one or both of the users being linked through the referral link.

When UserA—referrer 215 sends the referral link to the UserA—referral lead 220, the referrer may include in the message information relating to the type of vehicle the referral lead is looking for. For example, if a friend mentions that they are looking to buy a specific new car in blue with a sunroof and asks for a recommendation, then when the referrer sends the referral link to the referral, the referrer may type in that the referral is looking for a specific new car in blue with a sunroof. When the referral link is sent, the referred dealer representative (i.e., salesperson) receives a notification that a referral link has been created, and that notification includes the information about what the referral is looking for, which can be beneficial information for the dealer representative to during the initial contact with the referral.

In many cases, a referring user either has bought one or more vehicles from the dealer representative in the past, or is a personal friend, family member, co-worker, neighbor, community friend, friend of a friend, friend of a friend's family member, or other acquaintance, etc. of the dealer representative. A referring user may be called a "walking advertisement" for a dealer representative, since the referring user acts as an advertisement for the dealer. A referral lead may be called a "client" of a dealer representative.

Figure 3:
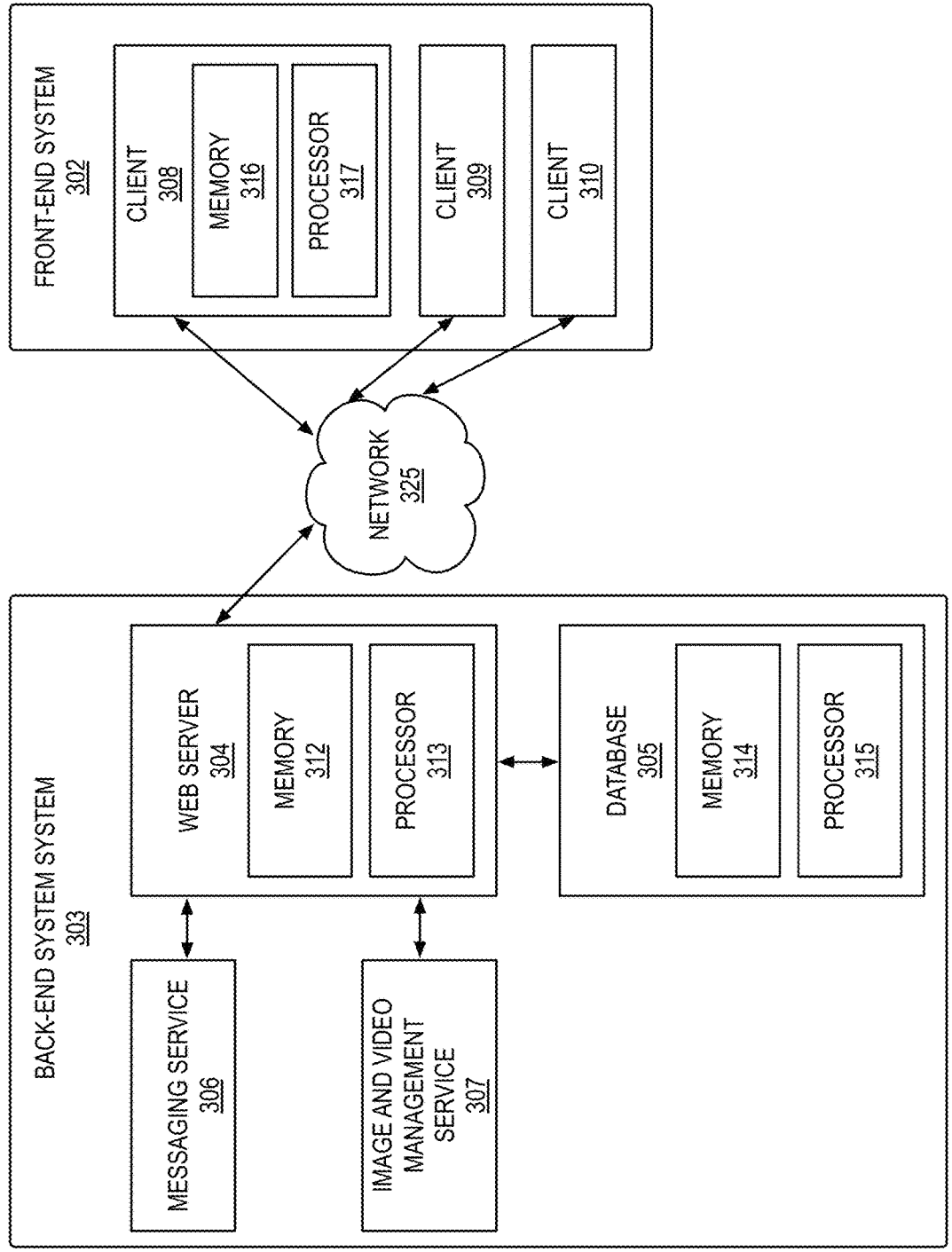
FIG. 3 depicts an exemplary architecture for implementing the dealer referral and rewards service.

The dealer referral and rewards service maintains the relationships between the users of the service in a database, as explained in further detail in the context of FIG. 3. The database includes the type of relationship between the referrer and the referral, as well as the type of relationship between the dealer representative and the referrer.

FIG. 3 depicts an exemplary architecture for implementing the dealer referral and rewards service.

Referring to FIG. 3, in the exemplary architecture shown, the dealer referral and rewards service 301 may be implemented as a client-server architecture, as is known in the art. The dealer referral and rewards service 301 includes a front-end system 302 and a back-end system 303. The front-end system 302 and the back-end system 303 may be connected over one or more networks 325. The exemplary embodiment of the dealer referral and rewards service 301 shown in FIG. 3 shows one architecture of the service 301, although a person of ordinary skill in the art will recognize that other architectures may be used to implement the service 301. In some embodiments, the components of the back-end system 303 are physically located at one computer or computing device. In other embodiments, the components of the back-end system 303 are physically located at separate computers or computing devices. The components of the back-end system 303 are communicatively coupled to one another over one or more networks 325 and communicate with one another over the network 325. In one embodiment, the back-end system 303 may be implemented using Amazon Web Services ("AWS").

The front-end system 302 includes one or more client devices 308-311. The client devices 308-311 are what users of the service use to access the service and may be any type of commercially available devices, such as, for example, cellular phones and tablets (e.g., Apple iPhones and iPads, Android devices) and other network-enabled computers and other devices (e.g., desktop computer, laptop computer, tablets, netbooks, 2-in-1 computers, etc.). The client devices 308-311 may include service-specific applications (such a mobile application on an Apple iPhone or Android phone) that access the service, or they may include web browsers that can access the service through a web-based user interface.

The back-end system 303 may include a web server 304 and a database 305. Each of the web server 304 and the database 305 may be implemented in a single computing device or across multiple computing devices. Regardless of how they are implemented, the web server 304 and the database 305 may each include a one or more processors (processor 313 and processor 315, respectively) and one or more memories (memory 312 and memory 314, respectively).

The back-end system 303 may further include a messaging service 306 and an image and video management service 307. These services may be integrated into the web server 304 and/or the database 305, or they may be implemented as separate components. The messaging service 306 may provide chat functionality within the dealer referral and rewards service 301, to allow the various users to chat with one another through the service 301. In one embodiment, the messaging service 306 may be implemented using a commercially available solution, such as PubNub. The image and video management service 307 may provide image/video hosting and management functionality within the dealer referral and rewards service 301, to efficiently store and provide images and videos of the automobiles and/or the package offers being sent and received within the service 301. In one embodiment, the image and video management service 307 may be implemented using a commercially available solution, such as Cloudinary.

In some embodiments, the back-end system 303 may integrate with a dealership's existing website and/or inventory database, such that the system 303 can pull one or more sales listings from the dealer's inventory. In many instances, auto manufacturers (e.g., Honda, Ford, etc.) provide access to their inventory management system through a customizable web interface. In other instances, auto manufacturers provide APIs through which the dealerships may access the inventory management system. In some embodiments, the back-end system 303 of the dealer referral and rewards service 301 is configured to access the inventory management system, either through the APIs or by being integrated directly into the inventory management system through a partnership with the dealer.

The dealer referral and rewards service 301 further includes a database 305 that is configured to store information relating to users of the service and the service itself. The database 305 stores information indicating relationships between users of the service and the status of those relationships. It is used to manage the relationships between the users of the service.

In one embodiment, the database 305 may include one or more of the following fields:
Date;
Lead Number;
User B—Dealer Representative;
Dealership;
Opportunity Status;
UserA—Referrer;
UserA—Referral (Lead);
Referral Relationship to Referrer;
Referrer Relationship to Dealer Representative;
Referral Relationship to Dealer Representative;
Vehicle Identification Number (VIN);
Dealer Stock Number;
Vehicle Model Year;
Vehicle Model;
Vehicle Make;
Vehicle Option;
MSRP;
Discount;
Options;
Warranty;
Financing Terms (such as, for example, Amount Financed, Length of Financing, Interest Rate, First Month Payment, Monthly Payment, Payment Due Date);
Lease Terms (such as, for example, Residual Value, Interest Rate, Money Factor, Lease Payment, Payment Due Date, etc.);
Tax, Title, & License;
Dealer Admin Fee;
Vehicle Purchased Price;
Down Payment;
Purchased Price—Down Payment;
Maintenance Plan;
Referrer Phone Number;
Referral Phone Number;
UserB Phone Number;
Referral Email Address;
Referrer Email Address;
UserB Email Address;
Transaction Reward;
Total Reward; and
Lost Reason.

In other embodiments, the database 305 may include additional fields for other information as relevant and/or necessary.

Each user (whether a UserA [referrer/referral] or UserB [dealer representative] of the dealer referral and rewards service is stored in the database 305. In some embodiments, users are stored using an associated unique user ID, which may be a name or a number. In some embodiments, the user chooses a unique user ID when creating an account for the service. In other embodiments, the service automatically assigns a unique user ID when the user creates an account for the service.

The database 305 also maintains a many-to-many relationship between UserA—Referrer users, UserA—Referral Lead users, and UserB—Dealer Representative users. This relationship between users is described above with respect to FIG. 2. The many-to-many aspect means that each user may be linked to multiple other users of any type. For example, a dealer representative may be linked to multiple referring users (which are sometimes called "walking advertisements" because they essentially function as an advertisement for the dealer who they provide referrals for). Similarly, a dealer representative may be linked to multiple referral leads (who are active clients of the dealer representative that the dealer representative is trying to convert into purchasers). A referring user may be linked to multiple dealer representatives (i.e., the referring user acts as a walking advertisement for multiple dealers). A referring user may also be linked to multiple referral leads (e.g., the referring user has told multiple of their family members and co-workers about a dealer representative that they've had a good experience with. A referral lead may be linked to multiple dealer representatives and multiple referring users (e.g., multiple friends have each provided links to different dealer representatives).

The Date field for a particular lead may be assigned by the service to each new lead that is added to the database to include the date the lead is established or added to the database.

The Lead Number field for a particular lead may be assigned by the service to each new lead that is added to the database. The Lead Number may be sequential, such that each new lead that is entered into the service is assigned the next available number. In other embodiments, the Lead Number may be assigned using other known methods for database management.

The UserB—Dealer Representative field for a particular lead may include the name or other identifying information (e.g., user ID number) of a UserB-type user for the lead. As explained above, the UserB-type user is a dealer representative. The Dealership field may include the dealership that the UserB—Dealer Representative is associated with or works for. The Dealership may include one or more sub-fields including the location of the Dealership (e.g., city and/or state).

The Opportunity Status field for a particular lead may include information regarding the current status of a particular lead. The Opportunity Status may include, for example, "Active," "Purchased," "Linked/In Progress," "Lost," "Canceled," or any other status descriptor that indicates the status of the lead. In some embodiments, the Opportunity Status may be stored using a code that translates to the various statuses.

The UserA—Referrer field for a particular lead may include the name or other identifying information (e.g., user ID number) of a UserA—Referrer type user for the lead. As explained above, the UserA—Referrer is the referring user who will earn a reward if the purchase is ultimately completed.

The UserA—Referral (Lead) field for a particular lead may include the name or other identifying information (e.g., user ID number) of a UserA—Referral (Lead) type user for the lead. As explained above, the UserA—Referral (Lead) type user is the user who is shopping for an automobile and who is linked with the dealer representative through a referral link.

The Referral Relationship to Referrer, Referrer Relationship to Dealer Representative, and Referral Relationship to Dealer Representative fields for a particular lead may include information describing or identifying the relationship between the various users in the relationship (i.e., the UserA—Referrer, UserA—Referral (Lead), and UserB—Dealer Representative users). These fields may include relationship information such as "spouse," "brother," "sister," "mother," "father," "son," "daughter," "cousin," "neighbor," "co-worker," "friend," "new user (cold)," or any other type of information that describes a relationship. In some embodiments, the information in these fields may be stored using a code that translates to the various relationships. In other embodiments, it may be stored in plain text, which allows for more personalized descriptions for each relationship.

The Vehicle Identification Number (VIN), Dealer Stock Number, Vehicle Model Year, Vehicle Model, Vehicle Make, Vehicle Option, MSRP, Discount, Options, and Warranty fields may include the specific details of one or more automobiles that the potential buyer is interested in, or, in the case of a completed purchase, the VIN of the automobile that was purchased. A potential buyer may be interested in more than one automobile, so the database may allow for multiple instances of each of these automobile fields such that multiple automobiles are represented for each lead. This may be accomplished, for example, by duplicating the information in the other database fields such that each automobile has its own lead entry in the database.

The Financing Terms and Lease Terms fields may include financing and/or lease information relating to each automobile the potential buyer is interested in. The Financing Terms field may include multiple sub-fields, such as, for example, Amount Financed, Length of Financing, Interest Rate, First Month Payment, Monthly Payment, and Payment Due Date. The Lease Terms may include multiple sub-fields, such as, for example, Residual Value, Interest Rate, Money Factor, Lease Payment, and Payment Due Date. The sub-fields may include any additional information necessary to represent the deal between the buyer and the seller. As mentioned above, a potential buyer may be interested in more than one automobile, so the database may allow for multiple instances of each of these Financing and/or Lease Terms sub-fields such that multiple automobiles are represented for each lead. This may be accomplished, for example, by duplicating the information in the other database fields such that each automobile has its own lead entry in the database. The information stored in the Financing Terms and/or Lease Terms fields and sub-fields allows for the specifics of the deal to be memorialized between the parties to the deal such that there are no surprises at the closing table when the final paperwork is signed.

The Tax, Title, & License, Dealer Admin Fee, Vehicle Purchased Price, Down Payment, Purchased Price—Down Payment, and Maintenance Plan fields may include the various fees and costs associated with a particular vehicle. As mentioned above, a potential buyer may be interested in more than one automobile, so the database may allow for multiple instances of each of these fields such that multiple automobiles are represented for each lead. This may be accomplished, for example, by duplicating the information in the other database fields such that each automobile has its own lead entry in the database. The information stored in these fields allows for the specific fees of the deal to be memorialized between the parties to the deal such that there are no surprises at the closing table when the final paperwork is signed.

The Referrer Phone Number, Referral Phone Number, UserB Phone Number, Referral Email Address, Referrer Email Address, and UserB Email Address fields include contact information (e.g., phone number and email address) for the various users in a particular referral relationship.

The Transaction Reward and Total Reward fields may include information relating to rewards information for each UserA—Referrer user. The Transaction Reward field may include, for example, the amount of the reward that the UserA—Referrer will earn if the associated automobile is purchased by the UserA—Referral Lead. The Total Reward field may include the total reward value the UserA—Referrer has earned through that user's participation in the service. This field provides the UserB—Dealer Representative with information that can be used to determine who the most valuable referral sources are for the dealer representative. As mentioned above, a potential buyer may be interested in more than one automobile, so the database may allow for multiple instances of each of these fields such that multiple automobiles are represented for each lead. This may be accomplished, for example, by duplicating the information in the other database fields such that each automobile has its own lead entry in the database.

The Lost Reason field may include information describing or identifying a reason that a purchase was not completed. This field may include "Lost interest," "Bought elsewhere,"

"Budget," "Not interested in offering," or any other description that may be helpful for the users. In some embodiments, the information in these fields may be stored using a code that translates to the various reasons. In other embodiments, it may be stored in plain text, which allows for more personalized descriptions for each lost reason.

Not all of the described fields may be populated for each lead stored in the database. For example, a deal may not include both financing and a lease. In some instances, if the buyer is purchasing, then there would be no lease information included in the deal. In another example, if the buyer is paying cash in full, then there would be no financing or leasing information included in the deal. In another example, a referral lead may be a so-called cold lead, meaning that potential buyer walked into the dealership or called the dealer representative directly. In such an instance, the UserA—Referrer and Referral Relationship to Referrer fields may not have any information included, and the Transaction Reward and Total Rewards fields may not have any information included, since there is no referring user. In another example, a buyer may not want a Maintenance Plan, so that field would be empty in the database for the particular vehicle.

The back-end system 303 maintains within the database 305 a list of purchases that each user has made. In some embodiments, the purchase information may be associated with the purchasing user, the dealer representative, and/or the referring user. The purchase information may include, for example, the specific car purchased (including VIN), the date of the purchase, the purchase price, the dealership the car was purchased from, the dealer who made the sale, and the referring user.

The back-end system 303 may include or be implemented using "cloud" functionality for managing multiple databases 305 and/or computer functions that are distributed across multiple physical servers. As such, it is envisioned that the dealer referral and rewards service may be implemented in the cloud and/or be cloud-based.

Figure 4:
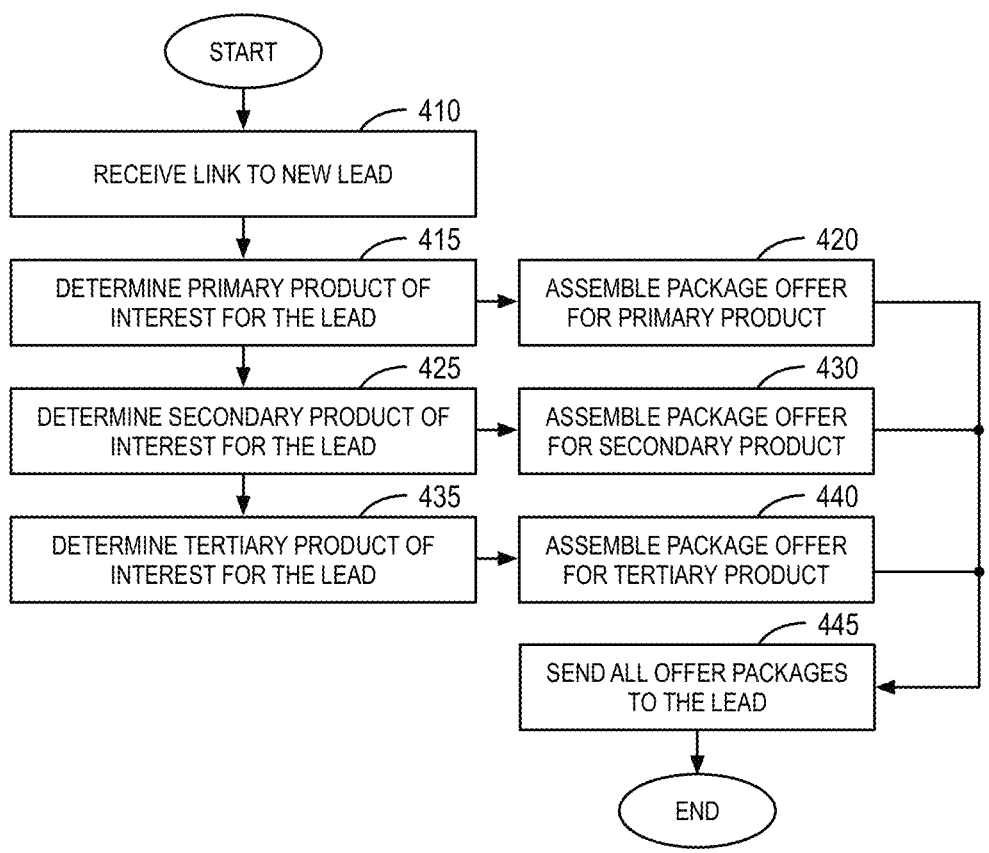
FIG. 4 depicts a flowchart of the referral and sales process from the perspective of a dealer representative.

FIG. 4 depicts a flowchart of the referral and sales process from the perspective of a dealer representative.

Referring to FIG. 4, at step 410, a dealer representative receives a link to a new lead (e.g., potential buyer). There are a number of different scenarios in which a link to the new lead may be received. One way a link to the new lead may be received is through a cold inquiry. In a cold inquiry, a user of the dealer referral and rewards service locates a dealer on their own, using the search or browse feature to locate a nearby dealer. Once they have found a dealer, they request to be linked to the dealer. This request shows up as a link to a new lead.

Another way a link to the new lead may be received is through a referral link. In a referral link, the dealer representative may already be linked to an existing user of the dealer referral and rewards service as a result of an existing relationship (the existing user may be referred to as a walking advertisement for the dealer representative). The existing relationship may be from a personal relationship (e.g., friend, family member, neighbor, etc.). The existing relationship may be from a professional relationship (e.g., previous customer or purchaser). The user to whom the dealer representative is already linked may provide a referral link that links the dealer representative to another user (e.g., a new user of the service or an existing user of the service to whom the referring user is already linked). This request shows up as a referral link to a new lead.

Figure 12:
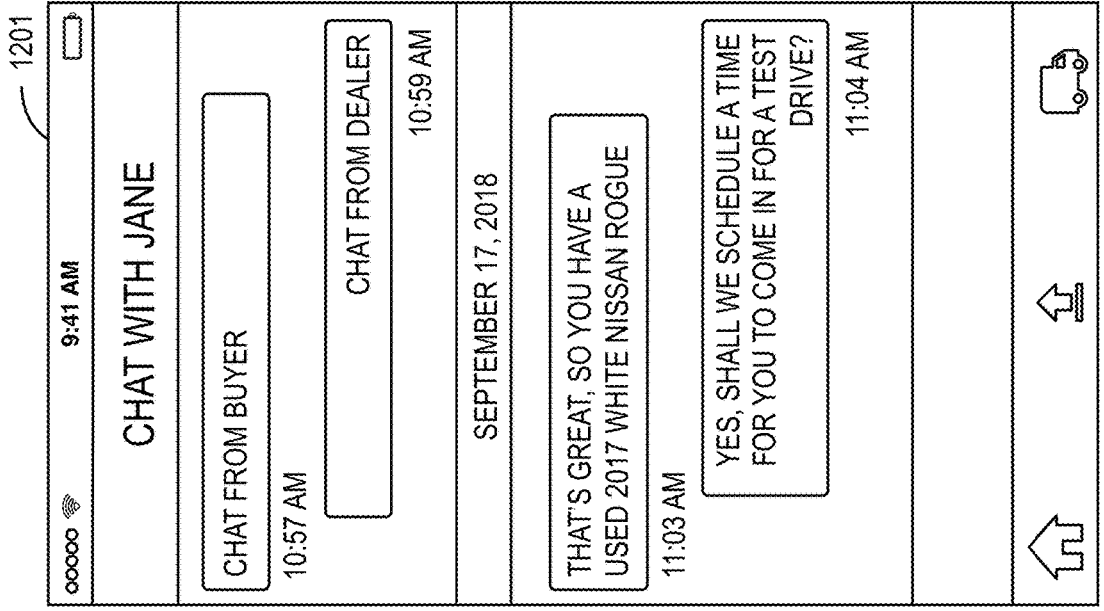
FIG. 12 depicts an example of a buyer's Chat screen on the mobile application of the dealer referral and rewards service.

At step 415, the dealer representative determines a primary product (e.g., car) that the potential buyer (i.e., new lead) is interested in. This may occur in a number of ways. For example, in one embodiment, the potential buyer can submit an inquiry to a linked dealer representative identifying their desired vehicle(s). In another embodiment, the dealer representative may chat with the potential buyer through the dealer referral and rewards service (e.g., through the mobile application or through a web-based user interface) to identify the potential buyer's desired vehicle(s), as shown in FIG. 12, for example. In another embodiment, the dealer referral and rewards service may connect the dealer representative with the potential buyer over a voice telephone call or a video conference. This connection may be created and maintained by the back-end system such that the potential buyer does not need to give the dealer representative their telephone number, which provides additional privacy/security for the potential buyer.

Once the dealer representative has determined a primary product that the potential buyer is interested in, the dealer representative, at step 420, assembles a product package offer for the primary product to present to the potential buyer. The product package offer may contain information relating to car being offered for sale, such as price, VIN number, mileage, photos, options/packages, etc.

The product package offer represents the dealer's final, out-the-door price to the buyer. As such, it may include any extended warranty or maintenance plan, and it factors in the user's in-house financing (if any) as well as the user's down payment (if any). The specific terms that allow the user and the dealer to arrive at the final package offer number may be negotiated ahead of time through the platform using the chat feature, or it may be done using phone calls. If the buyer is leasing the vehicle (as opposed to purchasing), then the product package offer represents all aspects of the entire leasing deal, such that the buyer can know exactly what their monthly payment will be and what they're getting for that monthly payment (e.g., allowed mileage, residual value, etc.). The product package offer allows the potential buyer to know exactly what the final sale will look like (with every detail accounted for) before they show up to the dealership to sign the paperwork.

In addition, based on the primary product that the potential buyer is interested in, the dealer representative may optionally further determine a secondary product that the potential buyer is interested in, at step 425, and a tertiary product that the potential buyer is interested in at step 435. The secondary and tertiary products may be products that are similar to the primary product, such as a car with similar options, or a car with the identical options but a different color, etc. Once the dealer representative has determined the secondary and tertiary products, the dealer representative may optionally assemble a product package offer for the secondary product, at step 430, and a product package offer for the tertiary product, at box 440.

Once the dealer representative has assembled one or more product package offers for products of interest to the potential buyer, the dealer sends, at step 445, the package offer(s) to the potential buyer through the dealer referral and rewards service.

The dealer representative and the potential buyer may further communicate and/or negotiate to arrive at a final product package offer that all parties are happy with. As such, it is understood that the process of assembling and sending product package offers may be an iterative process.

Figure 5:
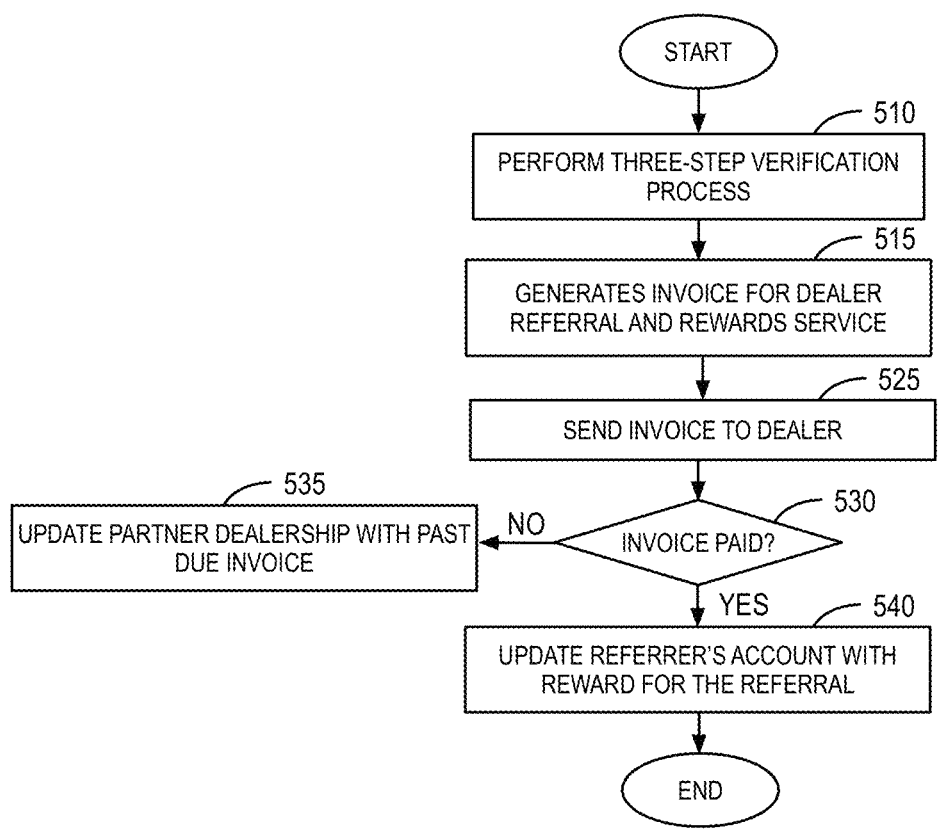
FIG. 5 depicts a flowchart of the rewards process from the perspective of the dealer referral and rewards service.

FIG. 5 depicts a flowchart of the rewards process from the perspective of the dealer referral and rewards service.

Referring to FIG. 5, when a purchase has occurred as a result of a referral made through the dealer referral and rewards service, the service performs a three-step verification process at step 510 (described in more detail below in the context of FIG. 6) to verify that a purchase has actually occurred. Once the purchase has been verified through the three-step verification process, the service generates an invoice for the service, at step 515. At step 525, the service sends the invoice to the partner dealership (i.e., the dealership from which the purchase was made). As step 530, the service monitors whether the outstanding invoice has been paid by the partner dealership. If the partner dealership has not paid the invoice, the service sends an updated invoice to the partner dealership with a past-due notice, at step 535. In one embodiment, the dealer referral and rewards service generates a notification and sends it to the partner dealership. The notification lets the partner dealership know that the invoice is past due. If the partner dealership has paid the invoice, the service updates the account of the referring user for that purchase to reflect that the user has earned a referral reward, at step 540, for the referral that led to the buyer's purchase from the dealer representative. This may include updating the status of the link between the users, updating the referring user's account, and sending a notification to the referring user.

Figure 6:
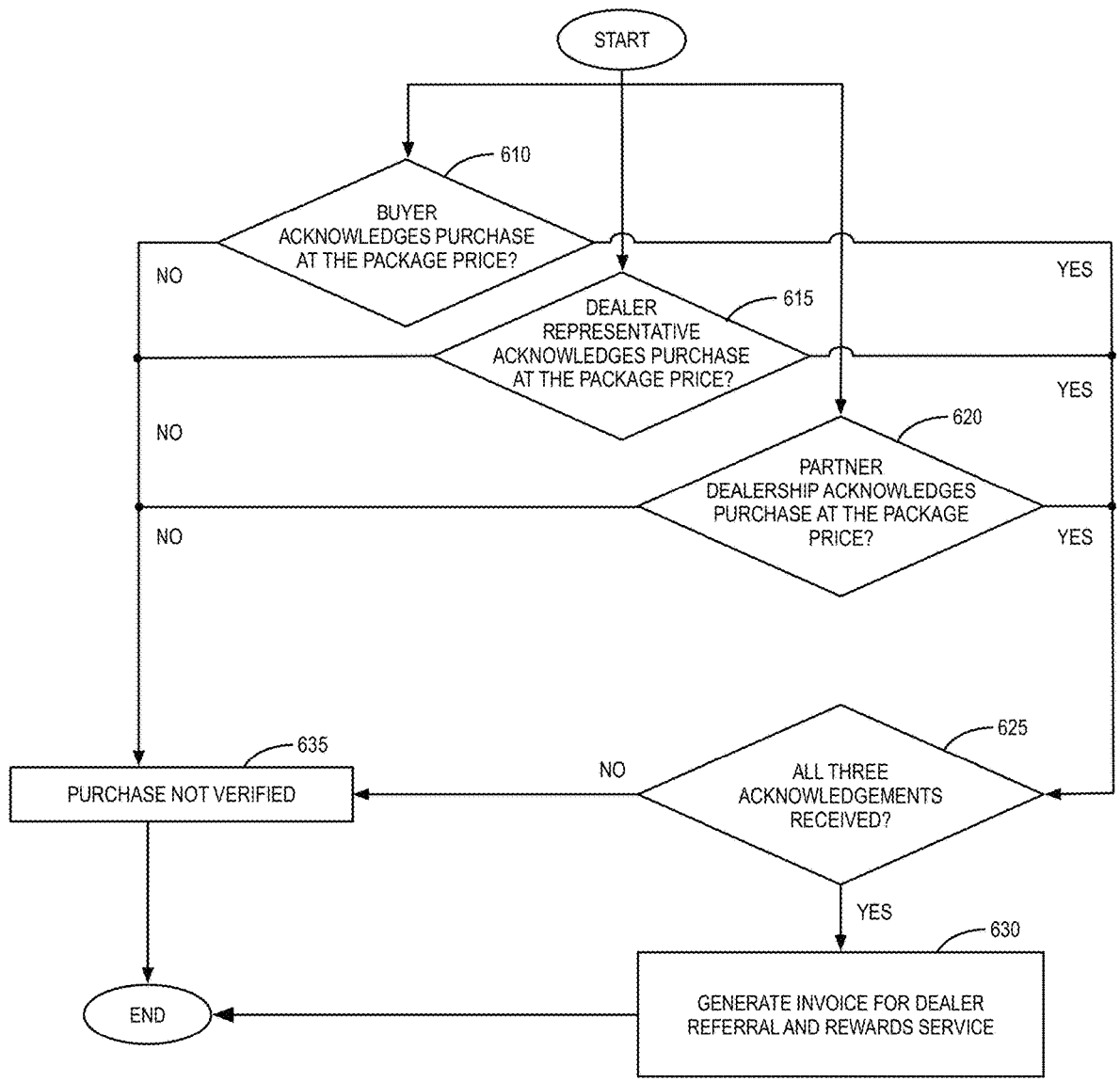
FIG. 6 depicts a three-step verification process that the dealer referral and rewards service uses to verify a vehicle purchase through the service.

FIG. 6 depicts a three-step verification process that the dealer referral and rewards service uses to verify a vehicle purchase through the service.

Referring to FIG. 6, to verify that a purchase has actually occurred, the dealer referral and rewards service uses a three-step verification process. The three-step verification process includes receiving a confirmation from each of the three parties to the purchase (i.e., the buyer, the salesperson, and the selling dealership) that the purchase has been completed.

At step 610, the buyer (i.e., UserA—Referral Lead) acknowledges the purchase at the package offer price. At step 615, the dealer representative (i.e., UserB—Dealer Representative) acknowledges the purchase at the package offer price. At step 620, the partner dealership acknowledges the purchase at the package offer price. Once all three verification steps have been confirmed through received acknowledgements (at step 625), the dealer referral and rewards service generates an invoice for the service to send to the partner dealership, at step 630. If any of the three purchase acknowledgements are not received, the purchase is not yet verified, and the dealer referral and rewards service will not generate an invoice.

Each of the three acknowledgements may be performed via any way of accessing the dealer referral and rewards service. For example, the buyer and the dealer representative may provide their acknowledgement through the service's mobile application or through the service's web-based user interface. The partner dealership may, for example, provide their acknowledgement through the service's dealer admin portal have access to a web portal that they can log in to via a web-based user interface.

In the context of this disclosure, a notification can mean many things, as will be understood by a person skilled in the art. For example, a notification may include updating a mobile application and/or web-based user interface such that the user sees it next time they log in to the app/user interface. As another example, a notification may include sending a separate notification to the user through the mobile application. As another example, a notification may include sending an email to the user being notified. As another example, a notification may include sending a text message to the user being notified.

Figure 7:
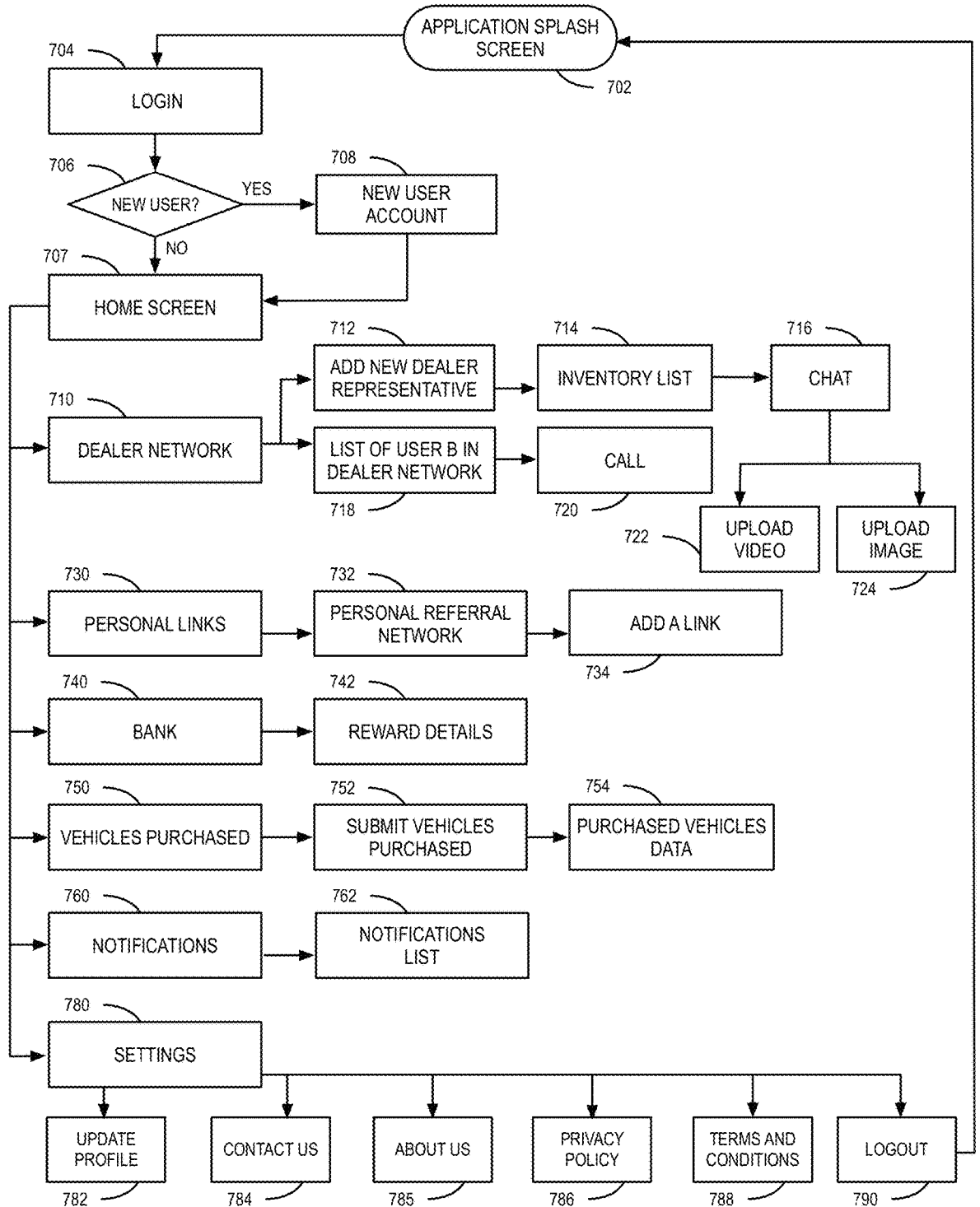
FIG. 7 depicts an exemplary flowchart showing the operation of the dealer referral and rewards service from the perspective of a UserA-type user (e.g., potential/previous buyer).

FIG. 7 depicts an exemplary flowchart showing the operation of the dealer referral and rewards service from the perspective of a UserA-type user (e.g., potential/previous buyer).

Referring to FIG. 7, at step 702, the dealer referral and rewards service presents a user with a splash screen. At step 704, the service allows a user to log in to the service. The service provides a user the option to either log in (if they already have an account) or create an account (if they do not already have an account). If the user is a new user (determined at step 706), the service allows the user to create a new user account, at step 708. If the user creates a new user account, the service stores the user's information (e.g., username and password) in the database of the back-end system. Once the user is logged in (after logging in or after creating an account), the service provides the user with a User Home screen, at step 707.

In various embodiments, the User Home screen may be implemented using different visual elements, but the dealer referral and rewards service provides the user with the ability to see and/or add dealers (via the Dealer Network screen at step 710), see and/or add links to other users (via the Personal Links screen at step 730), see the amount of rewards the user has earned (via the Your Bank screen at step 740), see and/or add vehicles that the user has purchased (via the Vehicles Purchased screen at step 750), view any notifications that have been sent to the user (via the Notifications screen at step 760), and view and/or change settings relating to the user's account (via the Settings screen at step 780).

Figure 11:
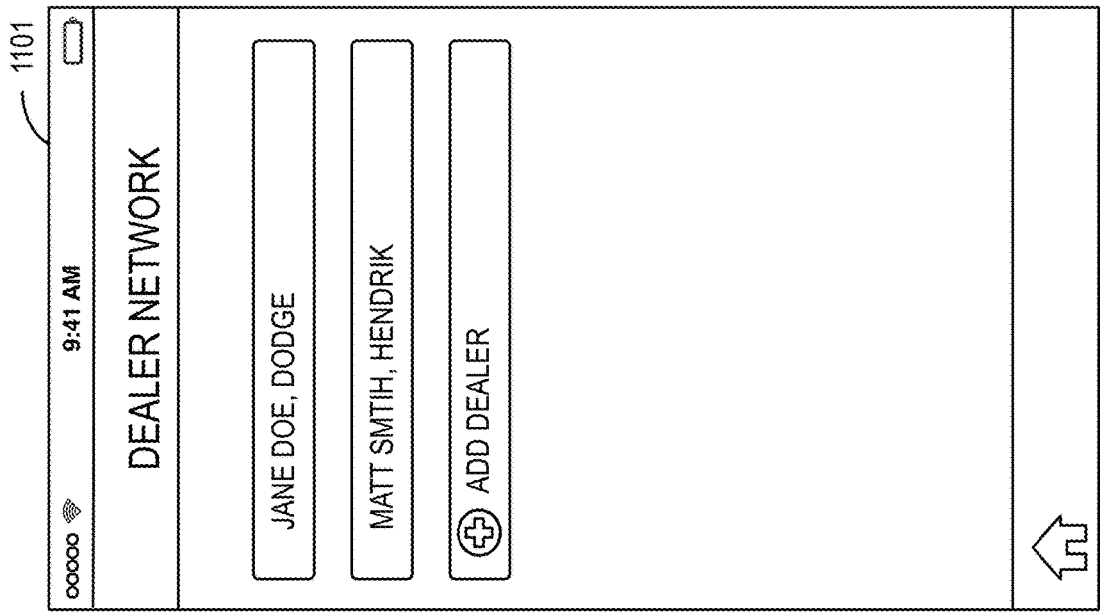
FIG. 11 depicts an example of a buyer user's Dealer Network screen on the mobile application of the dealer referral and rewards service.

If the user selects to view their Dealer Network from the User Home screen, the dealer referral and rewards service takes the user to a Dealer Network screen, at step 710 (see FIG. 11). The dealer referral and rewards service provides the user the ability (via the Dealer Network screen) to add a new dealer representative (at step 712) or view a list of dealers in the dealer network (at step 718). The dealer referral and rewards service provides the user the ability to view an inventory list (at step 714) and chat with the dealer representative (at step 716). From the chat screen, the user may upload video (at step 722) or upload an image (at step 724). In addition, the user may call the dealer representative (at step 620).

Figure 15:
FIG. 15 depicts an example of a buyer user's Personal Links screen on the mobile application of the dealer referral and rewards service.

If the user selects to view their Personal Links from the User Home screen, the dealer referral and rewards service takes the user to a Personal Links screen, at step 730 (see FIG. 15). The dealer referral and rewards service provides the user the ability (via the Personal Links screen) to view the personal referral network (at step 732) and/or add a link to the personal referral network (at step 734).

Figure 17:
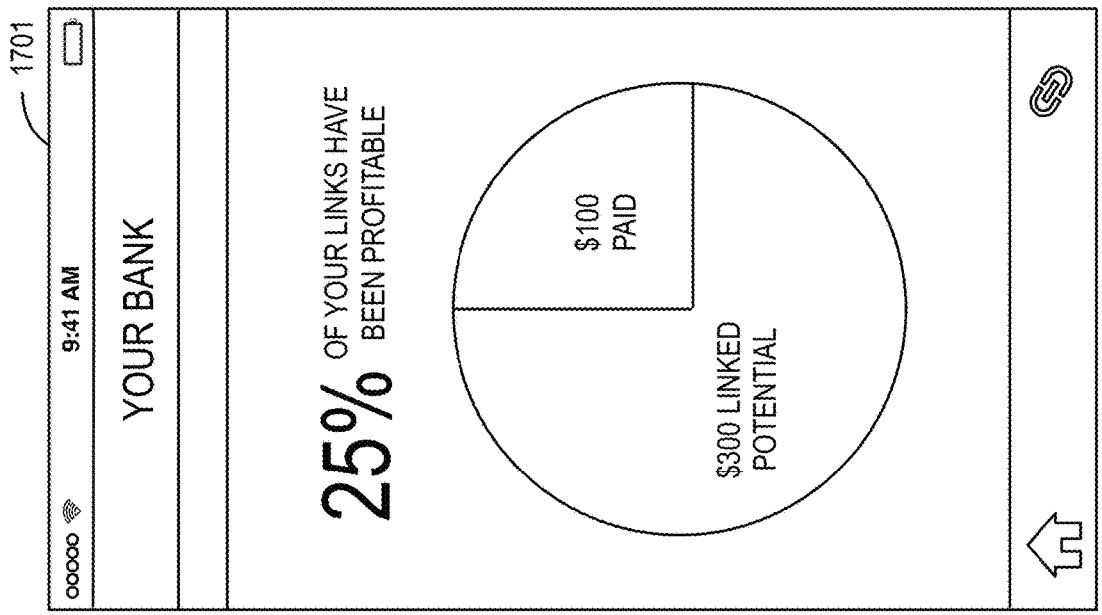
FIG. 17 depicts an example of a buyer user's Your Bank screen on the mobile application of the dealer referral and rewards service.

If the user selects to view their bank from the User Home screen, the dealer referral and rewards service takes the user to a Your Bank screen, at step 740 (see FIG. 17). The dealer referral and rewards service provides the user the ability (via the Your Bank screen) to view rewards details, at step 742.

Figure 18:
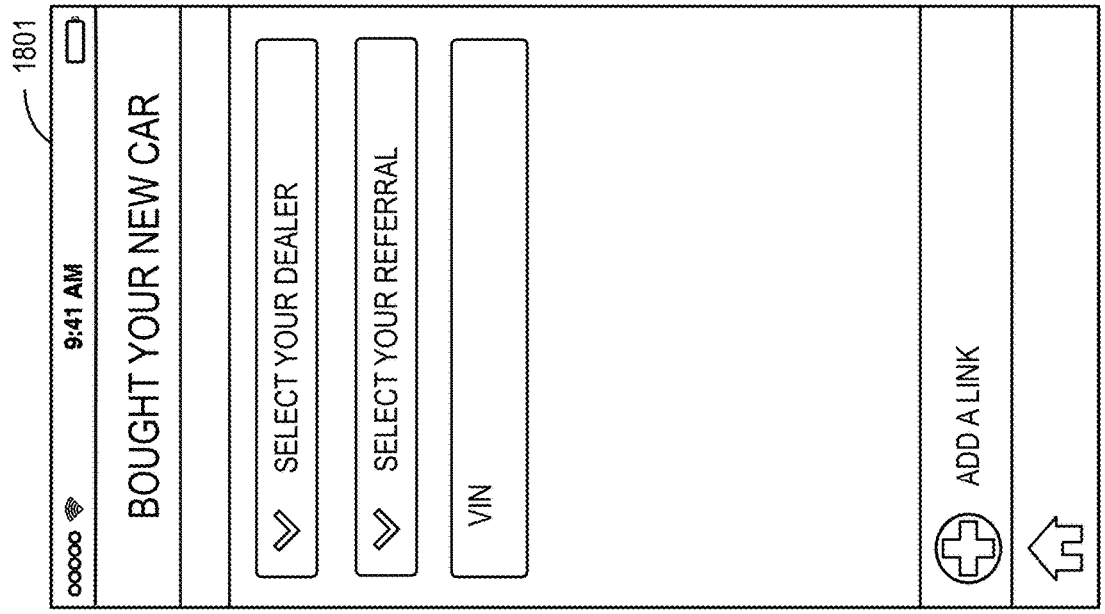
FIG. 18 depicts an example of a buyer user's Vehicles Purchased screen on the mobile application of the dealer referral and rewards service.

If the user selects to view vehicles purchased from the User Home screen, the dealer referral and rewards service takes the user to a Vehicles Purchased screen, at step 750 (see FIG. 18). The dealer referral and rewards service provides the user the ability (via the Vehicles Purchased screen) to submit vehicles purchased (step 752) and view purchased vehicles data (step 754).

Figure 19:
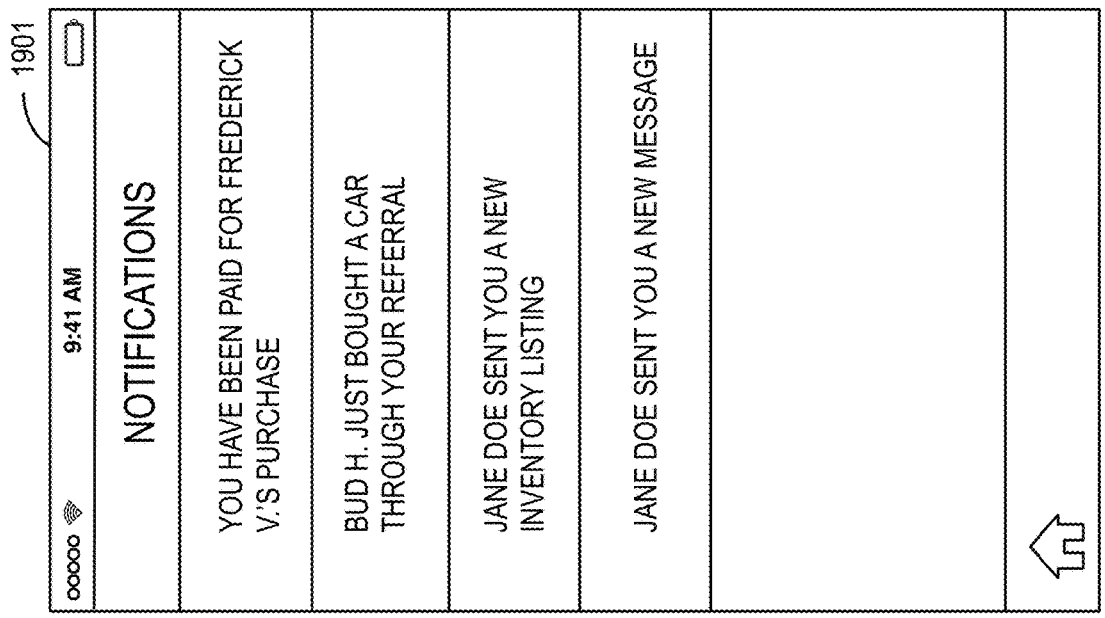
FIG. 19 depicts an example of a user's Notifications screen on the mobile application of the dealer referral and rewards service.

If the user selects to view notifications from the User Home screen, the dealer referral and rewards service takes the user to a Notifications screen, at step 760 (see FIG. 19). The dealer referral and rewards service provides the user the ability (via the Notifications screen) to view and/or act on a list of notifications that the user has received (step 762).

Figure 29:
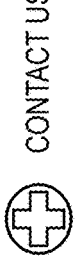
FIG. 29 depicts an example of a user's Settings screen on the mobile application of the dealer referral and rewards service.

If the user selects to view settings from the User Home screen, the dealer referral and rewards service takes the user to a Settings screen, at step 780 (see FIG. 29). The dealer referral and rewards service provides the user the ability (via the Settings screen) to update their profile (step 782), contact the dealer referral and rewards service (step 784), view information about the dealer referral and rewards service (step 785), view the privacy policy (step 786), view terms and conditions (step 788), and/or log out (step 790). If the user logs out, the dealer referral and rewards service takes the user to the application splash screen, at step 702.

Figure 8:
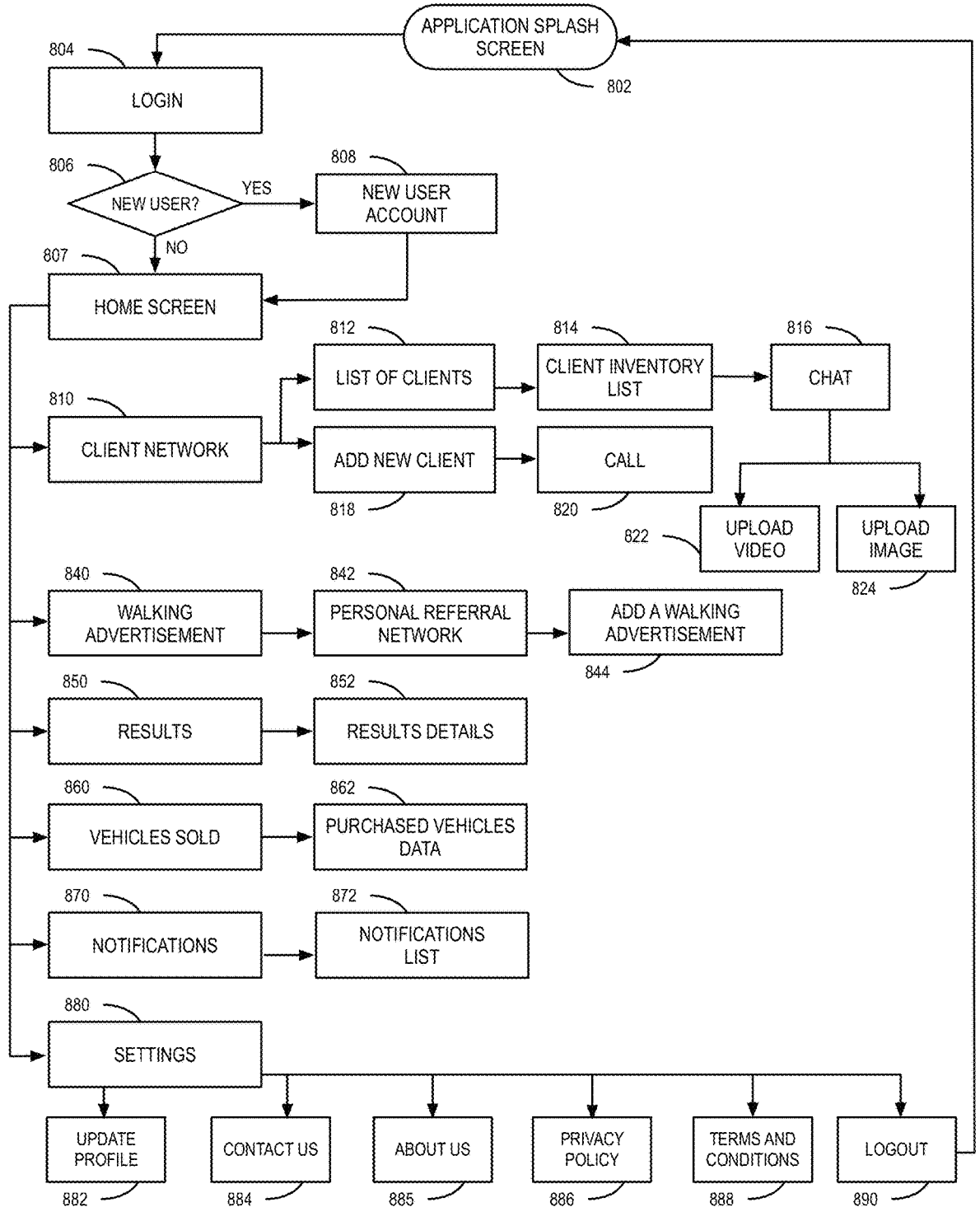
FIG. 8 depicts an exemplary flowchart showing the operation of the dealer referral and rewards service from the perspective of a UserB-type user (e.g., dealer representative/seller).

FIG. 8 depicts an exemplary flowchart showing the operation of the dealer referral and rewards service from the perspective of a UserB-type user (e.g., dealer representative/seller).

Referring to FIG. 8, at step 802, the dealer referral and rewards service presents a user with a splash screen. At step 804, the service allows a user to log in to the service. The service provides a user the option to either log in (if they already have an account) or create an account (if they do not already have an account). If the user is a new user (determined at step 806), the service allows the user to create a new user account, at step 808. If the user creates a new user account, the service stores the user's information (e.g., username and password) in the database of the back-end system. Once the user is logged in (after logging in or after creating an account), the service provides the user with a User Home screen, at step 807.

In various embodiments, the User Home screen may be implemented using different visual elements, but the dealer referral and rewards service provides the user with the ability to see and/or add clients (via the Client Network screen at step 810), see and/or add referral sources (also called "Walking Advertisements") (via the Walking Advertisement screen at step 840), view results of client interactions (via the Results screen at step 850), see and/or add to a list of vehicles that the user has sold to clients (via the Vehicles Sold screen at step 860), view any notifications that have been sent to the user (via the Notifications screen at step 870), and/or view and/or change settings relating to the user's account (via the Settings screen at step 880).

Figures 21, 22:
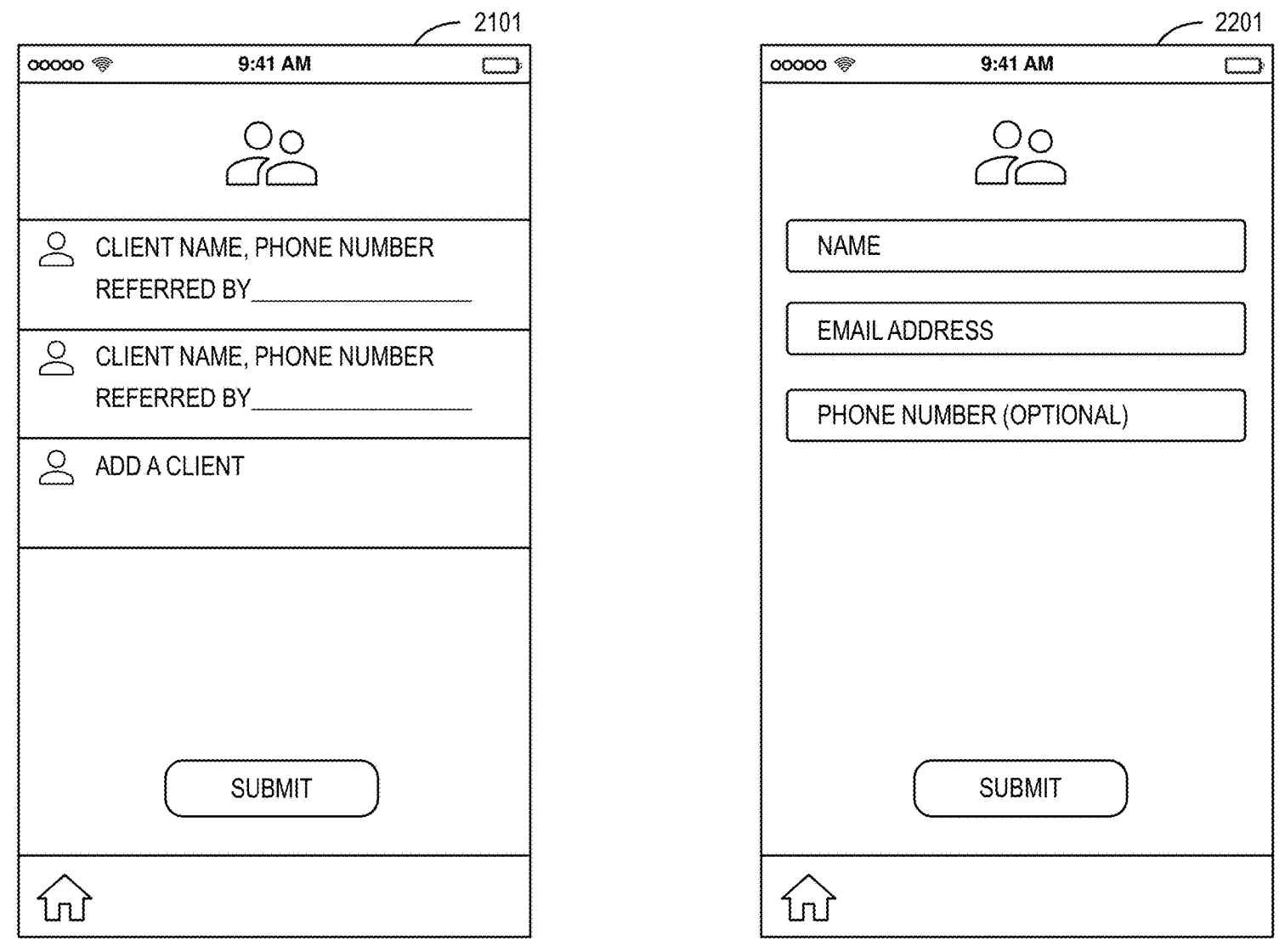

If the user selects to view their client network from the User Home screen, the dealer referral and rewards service takes the user to a Client Network screen, at step 810 (see FIG. 21). The dealer referral and rewards service provides the user the ability (via the Client Network screen) to view a list of clients (at step 812) or add a new client to the client network (at step 818). The dealer referral and rewards service provides the user the ability to view a client's inventory list (at step 814) and chat with the client (at step 816). From the chat screen, the dealer referral and rewards service provides the user the ability to upload a video (at step 822) or upload an image (at step 824). In addition, the dealer referral and rewards service provides the user the ability to call the client (at step 820).

If the user selects to view their walking advertisement from the User Home screen, the dealer referral and rewards service takes the user to a Walking Advertisement screen, at step 840. The dealer referral and rewards service provides the ability (via the Walking Advertisement screen) for the user to view the user's personal referral network (at step 842) and/or add a walking advertisement to the personal referral network (at step 844).

If the user selects to view their results from the User Home screen, the dealer referral and rewards service takes the user to a Results screen, at step 850. The dealer referral and rewards service provides the ability (via the Results screen) for the user to view details about results (e.g., completed purchases) the user has achieved from their clients, at step 852.

If the user selects to view vehicles sold from the User Home screen, the dealer referral and rewards service takes the user to a Vehicles Sold screen, at step 860. The dealer referral and rewards service provides the user the ability (via the Vehicles Sold screen) to view data relating to vehicles that the user has sold (step 862).

If the user selects to view notifications from the User Home screen, the dealer referral and rewards service takes the user to a Notifications screen, at step 870. The dealer referral and rewards service provides the user the ability (via the Notifications screen) to view and/or act on a list of notifications that the user has received (step 872).

If the user selects to view settings from the User Home screen, the dealer referral and rewards service takes the user to a Settings screen, at step 880 (see FIG. 29). The dealer referral and rewards service provides the user the ability (via the Settings screen) to update their profile (step 882), contact the dealer referral and rewards service (step 884), view information about the dealer referral and rewards service (step 885), view the privacy policy (step 886), view terms and conditions (step 888), and/or log out (step 890). If the user logs out, the dealer referral and rewards service takes the user to the application splash screen, at step 802.

Figure 9:
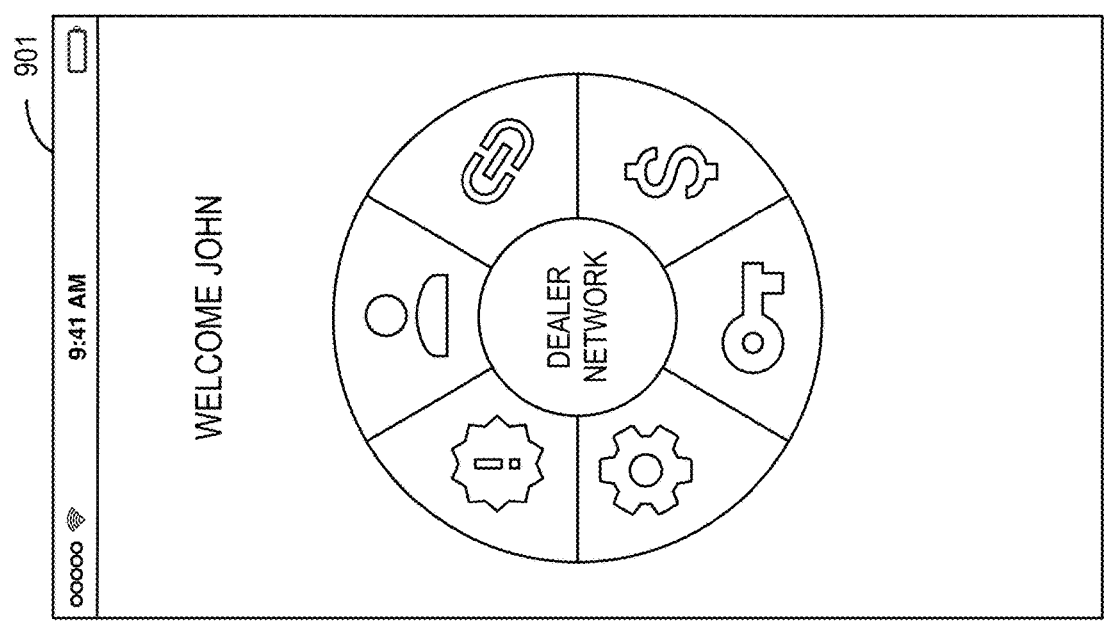
FIG. 9 depicts an example of a buyer user's User Home screen on the mobile application of the dealer referral and rewards service.

FIG. 9 depicts an example of a buyer user's User Home screen on the mobile application of the dealer referral and rewards service. The example shown is just one example, and the functionality described herein may be implemented in any graphical format, whether as part of a mobile application or as part of a web-based user interface.

Figure 20:
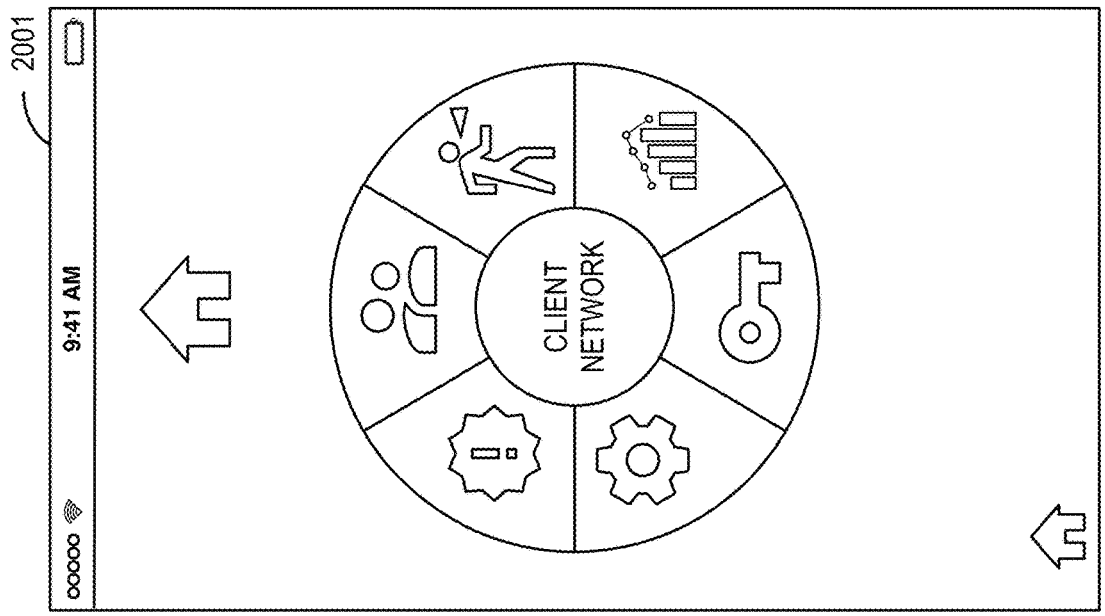
FIG. 20 depicts an example of a dealer user's User Home screen on the mobile application of the dealer referral and rewards service.

Referring to FIG. 9, at the User Home screen, the dealer referral and rewards service provides the user with a plurality of options for using the service. In the particular embodiment shown in FIG. 9, the example is a User Home screen for a UserA-type user. As shown in FIG. 20, below, a User Home screen for a UserB-type user looks similar and includes many of the same elements.

The options provided by the mobile application of the dealer referral and rewards service may include, for example, Dealer Network, Personal Links, Your Bank, Vehicles Purchased, Notifications, and Settings. In one embodiment, the options are presented visually in the shape of a wheel with a selection button in the middle of the wheel, and the user rotates the wheel and clicks the selection button to make a selection, with the option at the top of the wheel being the selected option. As the wheel rotates, the wedge that is at the top of the wheel is shown as highlighted, and the other wedges are shown as grayed out. An example of the wheel is shown in FIG. 9, with the active option being shown at the top of the wheel and the corresponding text displayed in the center of the wheel. In other embodiments, the options may be presented in other arrangements, as will be understood by a person skilled in the art.

Figure 10:
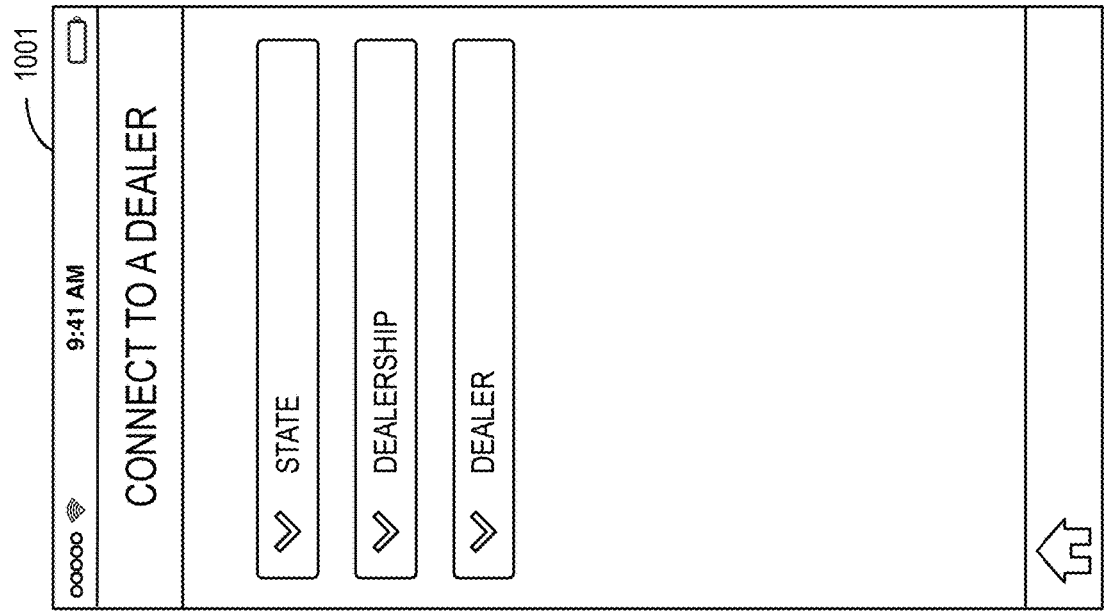
FIG. 10 depicts an example of a buyer user's Add a Dealer screen on the mobile application of the dealer referral and rewards service.

FIG. 10 depicts an example of a buyer user's Dealer Network screen on the mobile application of the dealer referral and rewards service. The example shown is just one example, and the functionality described herein may be implemented in any graphical format, whether as part of a mobile application or as part of a web-based user interface.

Referring to FIG. 10, when the user selects an option from the mobile application to go to the Add a Dealer screen, the user is taken there. When taking the user to the Add a Dealer screen, the mobile application queries the database (which is part of the back-end system, as explained above) of the dealer referral and rewards service to see if the user has any existing connected dealers. If the user does not have any connected dealers, then the mobile application provides the user with the ability to search for a dealership to connect to on the Add a Dealer screen.

In one embodiment, the mobile application displays drop-down lists for state, dealership, and dealer, as shown in the exemplary Add a Dealer screen of FIG. 10. The mobile application automatically populates the drop-down lists using information queried from the database of the back-end system, or using information stored locally in the memory of the mobile device running the mobile application, or any combination of the two. For example, the mobile application allows the user to select a state from the drop-down list, and then once the state has been selected, the application populates the dealership drop-down list with a selectable list of dealerships that is queried from the database. When the user selects a dealership from the dealership drop-down list, the application populates the dealer drop-down list with a selectable list of dealer representatives (e.g., salespeople at the selected dealership) that are available as part of the dealer referral and rewards service in the selected state of the selected dealership type. The user can then select any of the displayed dealer representatives to connect to. Once the user has selected a dealer representative, the mobile application updates information in the database of the back-end system indicating that the user has added that dealer to the user's dealer network. In one embodiment, the mobile application populates the drop-down lists in real-time by querying the database for the relevant dealer information from the back-end system as the user makes each subsequent selection in the drop-down list. In another embodiment, the mobile application stores the dealer information locally on the user's device and populates the drop-down lists using the locally stored information.

As explained with respect to FIG. 3, the back-end system of the dealer referral and rewards service maintains a list of available dealers in the database. In other embodiments, the mobile application may provide other ways of finding dealers through the Add a Dealer screen, as are known in the art. For example, the user may be able to search for a dealership by city or by zip code. As another example, the user may be able to search for a dealership by dealership type (e.g., Honda, Ford, Chevrolet, etc.). As another example, the mobile application may automatically search for a dealership based on the user's address stored in the user's profile information or based on the user's current location (determined by the mobile device's GPS). The user may be able to filter and/or sort available dealerships and/or dealers based on various criteria, including, for example, dealership rating, dealer rating, number of cars sold within a particular time frame by each dealership and/or each dealer, type/make/model of cars sold within a particular time frame by each dealership and/or each dealer.

After the user has linked to one or more dealers through the dealer referral and rewards service, the mobile application allows the user to select one of the linked dealers from the Dealer Network screen, at which point the mobile application provides the user a screen showing information for the selected dealer. From the screen showing information for the selected dealer, the mobile application allows the user to: (1) chat with the selected dealer (by, for example, selecting a Chat button); or (2) view the user's personal inventory from the selected dealer (by, for example, selecting a Personal Inventory button).

In one embodiment, from the screen showing information for the selected dealer, the mobile application allows the user to browse and/or search that dealer's available inventory (by, for example, selecting a Shop or Browse button).

FIG. 11 depicts an example of a buyer user's Dealer Network screen on the mobile application of the dealer referral and rewards service. The example shown is just one example, and the functionality described herein may be implemented in any graphical format, whether as part of a mobile application or as part of a web-based user interface.

If the buyer user has one or more linked dealers (i.e., dealer representatives), then the mobile application provides the user with the ability (via the Dealer Network screen shown in FIG. 11) to select from a list of the user's linked dealers, as well as an option to add a dealer. If the user selects to add a dealer, the mobile application provides the user with a screen for adding a dealer to the user's dealer network (as shown in FIG. 10).

FIG. 12 depicts an example of a buyer's Chat screen on the mobile application of the dealer referral and rewards service. The example shown is just one example, and the functionality described herein may be implemented in any graphical format, whether as part of a mobile application or as part of a web-based user interface.

The mobile application allows the user and the dealer to send individual messages to one another to discuss potential deals/purchases, etc. using the Chat screen. As mentioned above, the chat functionality is provided by the back-end system of the dealer referral and rewards service. In one embodiment, the chat functionality is handled by a messaging service that is integrated into the back-end system. In another embodiment, the chat functionality is handled by the back-end system itself.

Regardless of whether the chat functionality is provided by a separate messaging service or by the back-end system itself, the dealer referral and rewards service stores all messages exchanged between users to provide an audit trail, in case one is necessary. Similarly, the dealer referral and rewards service maintains transcripts of all conversations that occur through the service. In some embodiments, the messages are stored with an associated timestamp, so users can see when messages were sent. Because all messages are maintained by the service, they can always be displayed so that the users can see their message history anytime they pull up the Chat screen. If there is ever a dispute about what was said during the shopping and/or negotiation stages, there is a clear transcript to use as proof.

The mobile application allows users to upload one or more files as an attachment as part of the chat functionality. The user may select an upload button (as shown, for example, in FIG. 12), at which point the mobile application allows the user to select a file from local memory to upload into the chat. The file may be any type of file, including, for example, a photo, a video, or a PDF document. In some embodiments, the mobile application allows the user to take a photo using the mobile device's camera and use that picture to upload into the chat. In other embodiments, the mobile application allows the user to select a photo that is already saved on the mobile device.

The mobile application transmits the uploaded file to the back-end system, which stores the file. As explained above, in some embodiments, image and video management is handled by an integrated image and video management service. In other embodiments, the image and video management is handled by the back-end system itself, and it stores uploaded files.

The dealer referral and rewards service stores all files that are uploaded to the chats as part of the chat transcripts. Like with the chat messages, this allows the service to maintain an audit trail in case a dispute arises in the future. In some embodiments, the uploaded files are viewable directly from the Chat screen, where there is a link within the chat transcript that allows the user to open the file within the mobile application. In some embodiments, the Chat screen provides a preview functionality that shows a small version of the file and allows the user to click on the preview image to view the file in full size. In some embodiments, the mobile application allows the user to view all files that have been sent to that user throughout the application, or all the files that have been sent to the user by a particular dealer representative.

Figure 13:
FIG. 13 depicts an example of a buyer's Personal Inventory screen on the mobile application of the dealer referral and rewards service.

FIG. 13 depicts an example of a buyer's Personal Inventory screen on the mobile application of the dealer referral and rewards service. The example shown is just one example, and the functionality described herein may be implemented in any graphical format, whether as part of a mobile application or as part of a web-based user interface.

A user's personal inventory includes automobiles that have been saved in the user's profile with respect to that specific dealer and/or that specific dealership. The automobiles that make up the user's personal inventory may be selected by the dealer and added to the user's personal inventory, or they may be selected by the user and added to the user's personal inventory. In one embodiment, the dealer may add one or more automobiles directly to the user's personal inventory. When the dealer adds an automobile to the user's personal inventory, the dealer referral and rewards service may send a notification to the user to alert the user that a new automobile has been added. In another embodiment, the dealer cannot add an automobile to the user's personal inventory but instead can only suggest one or more automobiles to add to the user's personal inventory. When the dealer suggests one or more automobiles to add to the user's personal inventory, the service sends a notification to the user and allows the user to review the suggested automobile(s) and accept or reject them. In this embodiment, the dealer cannot fill the user's personal inventory with automobiles the user is not interested in. In addition, the dealer is able to see whether the user accepted or rejected the suggested automobile(s), which allows the dealer to get a better understanding for the type of car the user is interested in.

When the dealer adds an automobile to the user's personal inventory (either directly or by suggesting it to the user), the dealer may include a package offer for that automobile. As explained above, the package offer includes the user's final out-the-door price that includes all extras, such as, for example, extended warranty and/or a maintenance plan. In some embodiments, the dealer provides the package offer to the user in a text format, and the mobile application displays it to the user in that format. In other embodiments, the dealer provides the package offer to the user as an uploaded file. The uploaded file may be a deal sheet that shows all the details, or it may be the final dealership purchase paperwork (i.e., the exact paperwork that the user will sign when they go to pick up the automobile). The file may be provided as a PDF or as a photo, and is saved by the back-end system of the dealer referral and rewards service for future use by the user and/or the dealer.

The Personal Inventory screen shows a list of automobiles that have been added to the user's personal inventory, as shown, for example, in FIG. 13. For each automobile, the mobile application allows the user to view more details about the automobile. In the embodiment shown in FIG. 13, the mobile application includes a "+" sign for each automobile to allow the user to see more details. Other embodiments may use other buttons or ways of allowing the user to view more details about the particular car. The mobile application allows the user to remove an automobile from the personal inventory by selecting an option to delete the car. Similarly, in some embodiments, the dealer referral and rewards service may allow the dealer to remove an automobile from the user's personal inventory when that automobile is no longer available (e.g., if another dealer at the dealership sells it).

As explained above, automobiles in the user's personal inventory that were added by the dealer, the details may include a package offer for that automobile. For automobiles in the user's personal inventory that were added by the user, the dealer may access those cars through the dealer referral and rewards service (either through the dealer's mobile application or through a web-based user interface) and add a package offer for that automobile. In one embodiment, the service notifies the user when the dealer adds a package offer to an automobile in the user's personal inventory.

Figure 14:
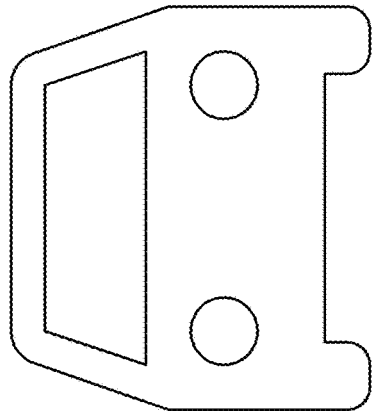
FIG. 14 depicts an example of a buyer user's Vehicle Detail screen on the mobile application of the dealer referral and rewards service.

FIG. 14 depicts an example of a buyer user's Vehicle Detail screen on the mobile application of the dealer referral and rewards service. The example shown is just one example, and the functionality described herein may be implemented in any graphical format, whether as part of a mobile application or as part of a web-based user interface.

If a user selects to view the details of an automobile in the user's personal inventory, the mobile application provides a screen showing the details of the selected automobile on the Car Detail screen, as shown, for example, in FIG. 14. In the example of the Car Detail screen shown in FIG. 14, the mobile application displays one or more photos of the automobile, if available, in a scrolling or other known format. The mobile application further displays a description of the automobile, the price of the automobile (e.g., MSRP, invoice, or other), and the VIN (or other identification number) of the automobile. In addition, the mobile application may further display notes about the automobile from the dealer, including the package offer and the final out-the-door price provided by the dealer.

As explained above, the dealer referral and rewards service uses referrals between customers to provide additional value to the participants in the service. When a user recommends a dealer to another user, that recommendation may result in the service generating a link between the user providing the recommendation and the user receiving the recommendation. If the user receiving the recommendation ultimately buys an automobile from the dealer as a result of the recommendation, the dealer referral and rewards service provides a monetary reward (e.g., check, gift card, etc.) to the recommending user. To implement the rewards system, the back-end system of the dealer referral and rewards service maintains an indication of a status type for each link between users. The status of a link may be: (1) linked; (2) purchased; (3) payment pending; and (4) transaction complete. In other embodiments, the service may use additional (or fewer) status types for describing a link between users.

FIG. 15 depicts an example of a buyer user's Personal Links screen on the mobile application of the dealer referral and rewards service. The example shown is just one example, and the functionality described herein may be implemented in any graphical format, whether as part of a mobile application or as part of a web-based user interface.

The mobile application allows a user to see their links to other users of the dealer referral and rewards service using the Personal Links screen. For each linked user listed on the user's Personal Links screen, the mobile application may display an indication of the status of the link, as discussed above. In some embodiments, the status indicator may be text listing the status. In other embodiments, the status indicator may be a status wheel, as shown in the example of FIG. 15. In the example with four status types (as described above), the status wheel is divided into four sections (i.e., one for each different status type). As the link progresses from one status type to the next, the mobile application displays the status wheel with the sections filled in accordingly. Other ways of showing the status may be used within the scope of this disclosure, such as, for example, a bar graph, a color-coded scheme, a numerical system, etc., as will be understood by a person skilled in the art.

Figure 16:
FIG. 16 depicts an example of a buyer user's Add a Link screen on the mobile application of the dealer referral and rewards service.

FIG. 16 depicts an example of a buyer user's Add a Link screen on the mobile application of the dealer referral and rewards service. The example shown is just one example, and the functionality described herein may be implemented in any graphical format, whether as part of a mobile application or as part of a web-based user interface.

The dealer referral and rewards service allows an existing user to create a link to another person who may be interested in purchasing an automobile. The person who may be interested in purchasing an automobile may already be a user of the service, or they may not yet be a user of the service. In one embodiment, as shown in FIG. 15, the Personal Links screen of the mobile application may include an option that allows the user to add a link when the option is selected. When a user would like to add a link to another person, the user selects the option to add a link, and the mobile application allows the user to enter and submit the name and email address of the person that the user would like to add a link to.

In some embodiments, the user may also enter a message to the person being added. In some embodiments, the user may also enter information about the type of automobile the person receiving the link may be interested in. When the user submits the information to the service, the back-end system of the dealer referral and rewards service queries the database to determine if the person the user identified (i.e., the receiver of the link) is already a member of the dealer referral and rewards service. If the person the user identified is already a member of the service, then the service sends a notification to the person (e.g., via the mobile application) that the submitting user has requested that the service establish a link between the submitting user and requested user. If the person the user identified is not already a member of the dealer referral and rewards service, then the back-end system generates and sends an email to the person (at the email address entered by the user) inviting them to join the dealer referral and rewards service. In one embodiment, the invite email may include a link that takes the user to a web-based sign-up system. In another embodiment, the invite email may include a link that takes the user to an online marketplace where the user can download the mobile application for the dealer referral and rewards service (e.g., Google Play store, Apple App Store, etc.) and create an account through the mobile application. Regardless of whether the user creates an account through the web-based interface or through the mobile application, the back-end system creates the personal link between the recommending user and the new user and stores that link in the database. In one embodiment, when the service creates the link, the back-end system also automatically adds the recommended dealer to the new user's dealer network.

FIG. 17 depicts an example of a buyer user's Your Bank screen on the mobile application of the dealer referral and rewards service. The example shown is just one example, and the functionality described herein may be implemented in any graphical format, whether as part of a mobile application or as part of a web-based user interface.

The mobile application allows the user to view the status of rewards that the user has earned, as shown, for example, in the Your Bank screen shown in FIG. 17. As explained above, when a user recommends a dealer to another person through a link, and that other person ultimately purchases an automobile from that dealer, the dealer referral and rewards service awards the recommending user a reward. The back-end system of the dealer referral and rewards service maintains a status of links between users and tracks the status of links over time using the database of the back-end system, and it is configured to cross-reference that information with purchases made by users. Additionally, the back-end system maintains a record of each user's rewards (e.g., in the Total Reward field), as well as each user's potential rewards (e.g., a referral link that could mature into a purchase). For example, the mobile application may query the database for all database entries with the user listed as UserA—Referrer. From the results of that query, the mobile application or the back-end system may calculate the total number of potential/pending transactions for the user, and (2) the total potential reward value those transactions, using, for example, the Transaction Reward information. For example, as shown in the example of FIG. 17, the user has been earned $100 worth of rewards and has another $300 worth of linked potential. In other words, if all of the user's personal links purchase a car, then the user will receive an additional $300 in rewards. In one embodiment, and as shown in FIG. 17, the mobile application may use a status wheel to indicate the amount of rewards earned the user has earned and the amount of potential rewards the user has outstanding.

FIG. 18 depicts an example of a buyer user's Vehicles Purchased screen on the mobile application of the dealer referral and rewards service. The example shown is just one example, and the functionality described herein may be implemented in any graphical format, whether as part of a mobile application or as part of a web-based user interface.

As explained in the context of FIG. 6 above, the dealer referral and rewards service verifies that an automobile has been purchased before providing a reward to the referring user. The verification process involves receiving confirmation from the purchasing user, the dealer, and the partner dealership that the purchase has occurred. As such, the service includes functionality that allows a user to input an automobile purchase that the service uses as verification.

The mobile application allows a user to manually input one or more automobiles that the user has previously purchased. In the example shown in FIG. 18, the mobile application may provide drop-down boxes that allow a user to select the dealer from whom the automobile was purchased and the user who provided the referral for that dealer. In some embodiments, the mobile application automatically populates the drop-down boxes using information stored in the database of the back-end system. For example, the mobile application automatically populates the drop-down box for the dealers with whom the user has an established link. When the user selects a dealer, the mobile application automatically populates the drop-down box for the referring user using information from the database of the back-end system. In many instances, a user will only have one linked referring user for a particular dealer; in this situation, the mobile application automatically populates the drop-down box with the referring user for the selected dealer. If the user is linked to more than referring user for the selected dealer, the mobile application automatically populates the drop-down box with the multiple referring users so that the user can select the correct one. When the dealer and referring user have been selected (either automatically or by the user), the mobile application automatically populates the box for the VIN of the automobile purchased, if possible. If there are more than one possible purchased automobiles, the mobile application provides the user the option to select the correct automobile. As with the other boxes, the mobile application automatically populates the fields in response to the user's selections using information from the database of the back-end system.

When the user enters their automobile purchase through the mobile application as described above, the back-end system of the dealer referral and rewards service updates the status of the link between the referring user and the referral to "pending" status within the database and sends a notification to the referring user indicating that an award is pending.

FIG. 19 depicts an example of a user's Notifications screen on the mobile application of the dealer referral and rewards service. The example shown is just one example, and the functionality described herein may be implemented in any graphical format, whether as part of a mobile application or as part of a web-based user interface.

When a user receives a notification, the dealer referral and rewards service may provide the information to the user in a number of different ways. The mobile application shows the user the notifications that have been received, as shown in FIG. 19. For example, the Notifications screen may notify the user that the user has been paid for an automobile purchase made by a referral. As another example, the Notifications screen may notify the user that a referral has purchased an automobile. As another example, the Notifications screen may notify a user that one of the user's linked dealer representative has sent the user a new inventory listing. As another example, the Notifications screen may notify a user that one of the user's linked dealer representatives has sent the user a new message. The generation of notifications may be triggered when the Opportunity Status field is changed (or initially populated) in the database of the back-end system.

FIG. 20 depicts an example of a dealer user's User Home screen on the mobile application of the dealer referral and rewards service. The example shown is just one example, and the functionality described herein may be implemented in any graphical format, whether as part of a mobile application or as part of a web-based user interface.

Referring to FIG. 20, at the User Home screen, the dealer referral and rewards service provides the user with a plurality of options for using the service. In the embodiment shown in FIG. 20, the example is a User Home screen for a UserB-type user.

The options provided by the mobile application of the dealer referral and rewards service may include, for example, Client Network, Walking Advertisements, Results, Vehicles Sold, Notifications, and Settings. In one embodiment, the options are presented visually in the shape of a wheel with a selection button in the middle of the wheel, and the user rotates the wheel and clicks the selection button to make a selection, with the option at the top of the wheel being the selected option. As the wheel rotates, the wedge that is at the top of the wheel is shown as highlighted, and the other wedges are shown as grayed out. An example of the wheel is shown in FIG. 20, with the active option being shown at the top of the wheel and the corresponding text displayed in the center of the wheel. In other embodiments, the options may be presented in other arrangements, as will be understood by a person skilled in the art.

FIG. 21 depicts an example of a dealer user's Client Network screen on the mobile application of the dealer referral and rewards service. The example shown is just one example, and the functionality described herein may be implemented in any graphical format, whether as part of a mobile application or as part of a web-based user interface.

Referring to FIG. 21, when the user selects an option from the mobile application to go to the Client Network screen, the user is taken there. When taking the user to the Client Network screen, the mobile application queries the database (which is part of the back-end system, as explained above) of the dealer referral and rewards service to see if the user has any existing connected clients. If the user does not have any connected client, then the mobile application provides the user with the ability to add a client on the Client Network screen.

If the user has one or more connected clients, then the Client Network screen shows a selectable list of the user's connected clients, as well as an option to add another connected client, as shown, for example, in FIG. 21. If the user selects to add a client, the mobile application provides the user with a screen for adding a client to the user's client network.

When a referral lead (i.e., client) goes cold (i.e., the lead is no longer interested in buying from a particular dealer representative), the dealer referral and rewards service may handle this situation in a number of ways. First the service removes the lead from the list of clients in the dealer's mobile application. This allows the dealer to see only relatively fresh leads in their client list. The service may determine that the lead has gone cold in a number of ways. One way it may do so is when the referral lead deletes the relationship from their mobile application, which indicates that the referral lead is no longer interested. Another way the service may determine that the lead has gone cold is if the referral lead buys a vehicle from another dealer through the service (e.g., the referral lead is working with multiple dealers simultaneously and buys from one of them). Outside of unusual circumstances, once the referral lead has bought a car, that referral is likely no longer interested in buying a car. Another way the service may determine that the lead has gone cold is based on an particular amount of time having passed either since the referral lead and the dealer representative had any contact through the platform, or since the referral lead has logged into their mobile application. Even if the referral link is removed from the dealer representative's mobile application, it may not be removed from the referral lead's application (e.g., because the referral lead may later want to be able to contact that dealer), and it is not removed from the platform's database, so that there will always be a record of the link.

FIG. 22 depicts an example of a dealer user's Add a Client screen on the mobile application of the dealer referral and rewards service. The example shown is just one example, and the functionality described herein may be implemented in any graphical format, whether as part of a mobile application or as part of a web-based user interface.

Referring to FIG. 22, in one embodiment, the mobile application allows the user to enter a name and email address of the client to be added to the client network. The mobile application further allows the user to optionally enter a phone number of the client to be added to the client network. When the user submits the information to the dealer referral and rewards service, the back-end system of the service stores that information in the database and creates a linked relationship in the database. The back-end system also generates and sends an invitation to the client being added from the Add a Client screen.

After the user has connected with one or more clients through the dealer referral and rewards service, the mobile application allows the user to select one of the connected clients from the Client Network screen, at which point the mobile application provides the user a screen showing information for the selected client. From the screen showing information for the selected client, the mobile application allows the user to: (1) chat with the selected client (by, for example, selecting a Chat button); or (2) view the client's personal inventory from the selected user.

Figures 23, 24:
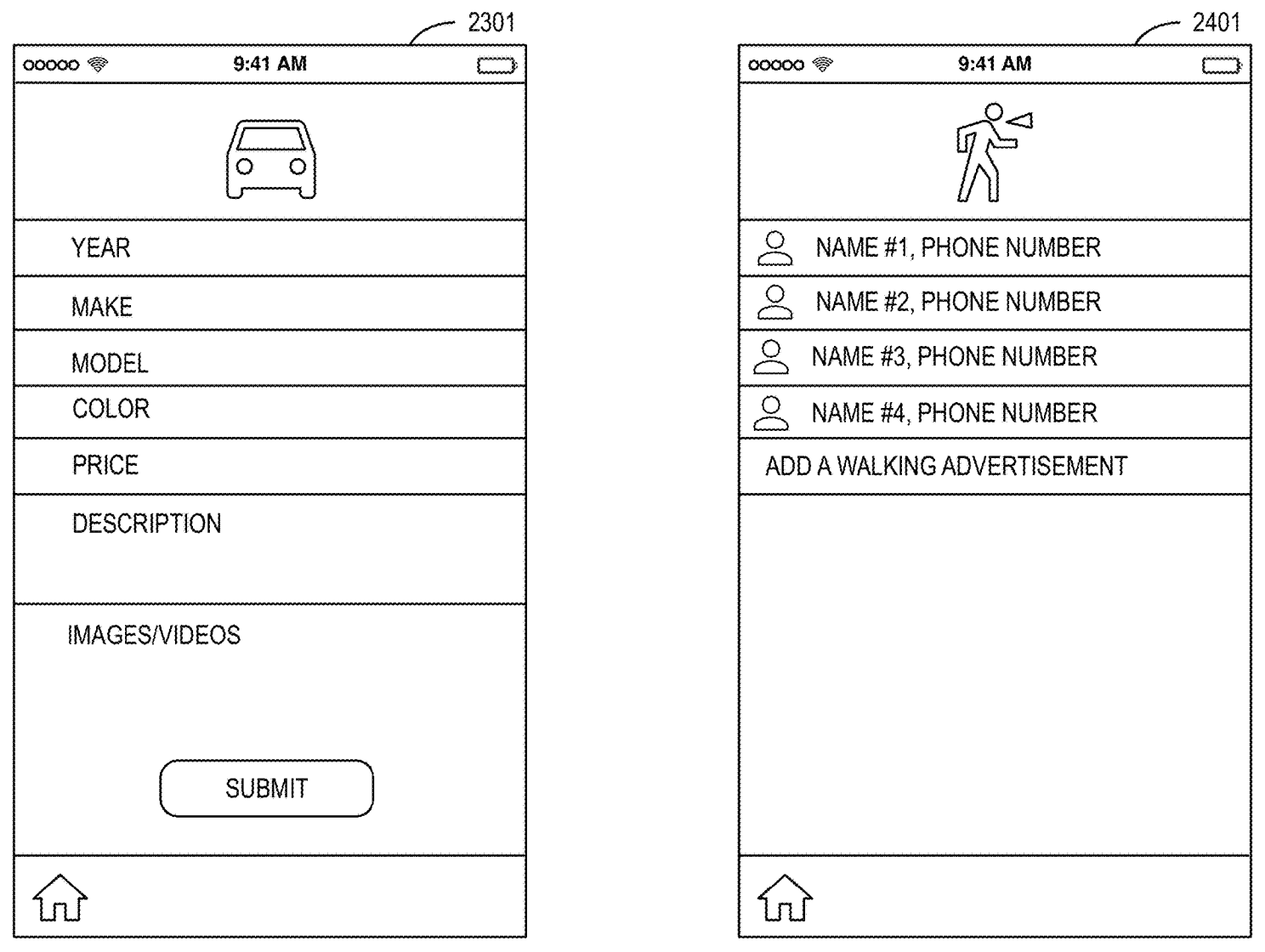

FIG. 23 depicts an example of a dealer user's screen that allows the dealer to enter a package offer for a client on the mobile application of the dealer referral and rewards service. The example shown is just one example, and the functionality described herein may be implemented in any graphical format, whether as part of a mobile application or as part of a web-based user interface.

Referring to FIG. 23, the mobile application allows a dealer to add a vehicle to a client's personal inventory, as explained in detail above. The mobile application allows a user to enter details about the vehicle to add to the client's personal inventory. The details about the vehicle to be added to the client's personal inventory may include, for example, Year, Make, Model, Color, Price, Description, and Images/Videos. The user may type in some or all of this information manually. In some embodiments, as explained above, the dealer referral and rewards service is integrated with the inventory system of the user/dealer's dealership. In these embodiments, the mobile application provides the user the ability to look up a particular vehicle in the dealership's inventory, and the mobile application auto-populates the information from the inventory system.

Regardless of how the information is entered into the mobile application (e.g., by the user manually entering it or by the system automatically populating it), the information may include one or more photos and/or videos of the vehicle. As explained above, the photos and/or videos may be managed by the back-end system using an image and video management service. In addition, the user may type additional information into the description field. The additional information entered by the user may include details about a product package offer. As explained above, the dealer may provide the client with a product package offer that includes a final, out-the-door price. The dealer may type that information into the description field shown in FIG. 23. Additionally, the dealer may add an image of the final paperwork that corresponds with the included product package offer, such that the client can see the exact breakdown of the numbers for the product package offer, as well as the paperwork that the client will ultimately sign at the dealership if they end up going through with the sale.

FIG. 24 depicts an example of a dealer user's Walking Advertisements screen on the mobile application of the dealer referral and rewards service. The example shown is just one example, and the functionality described herein may be implemented in any graphical format, whether as part of a mobile application or as part of a web-based user interface.

Referring to FIG. 24, when the user selects an option from the mobile application to go to the Walking Advertisements screen, the user is taken there. When taking the user to the Walking Advertisements screen, the mobile application queries the database (which is part of the back-end system, as explained above) of the dealer referral and rewards service to see if the user has any existing linked walking advertisements (e.g., users linked in the database as a referring user).

Figures 25, 26:
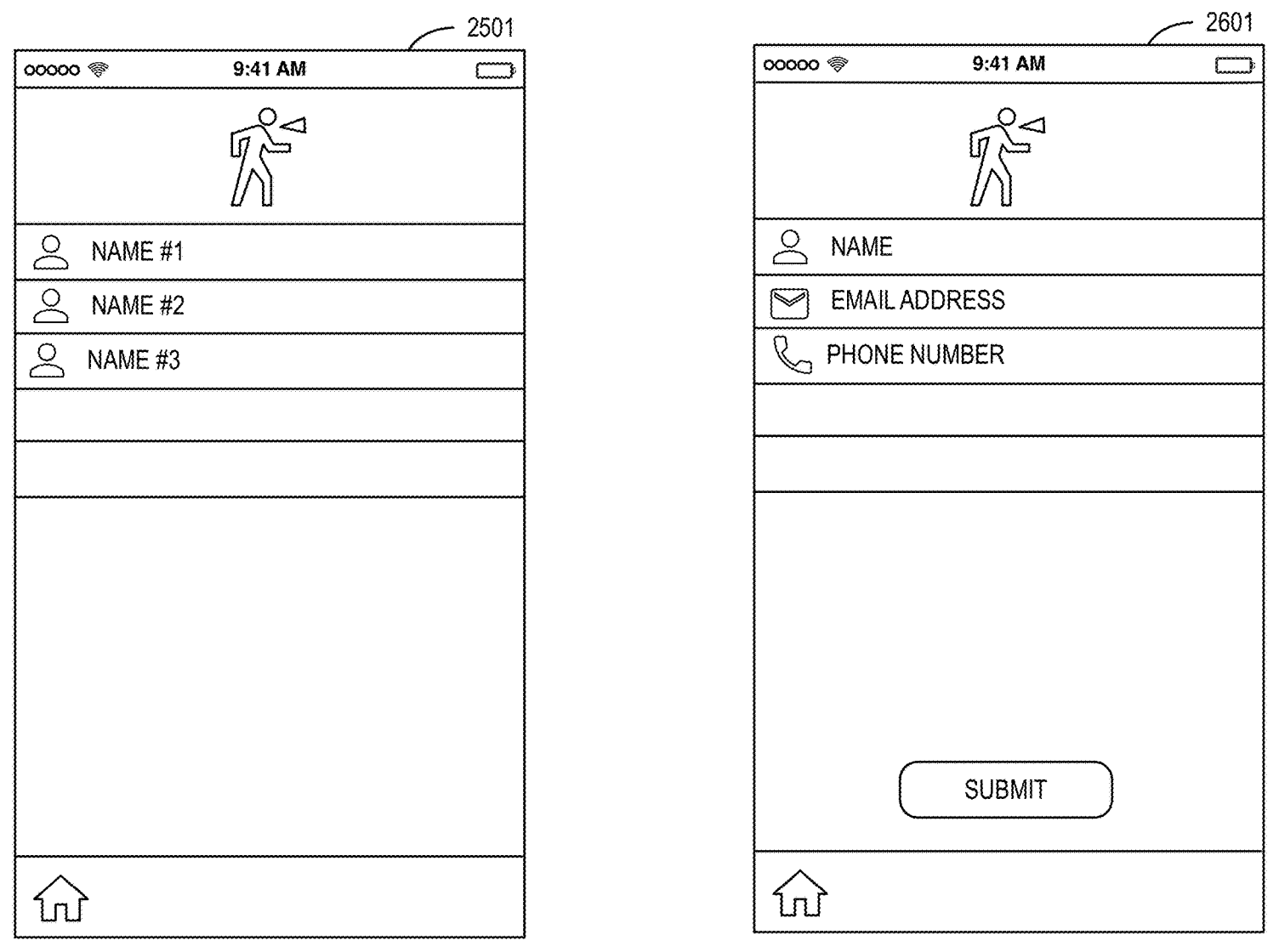

The mobile application provides the user with the ability to add a walking advertisement on the Walking Advertisements screen (see FIG. 26).

If the user has one or more linked walking advertisements, then the Walking Advertisements screen shows a selectable list of the user's linked walking advertisements, as well as an option to add another linked walking advertisement, as shown, for example, in FIG. 24. If the user selects to add a walking advertisement, the mobile application provides the user with a screen for adding a walking advertisement.

FIG. 25 depicts an example of a dealer user's screen for a particular walking advertisement on the mobile application of the dealer referral and rewards service. The example shown is just one example, and the functionality described herein may be implemented in any graphical format, whether as part of a mobile application or as part of a web-based user interface.

When a user selects a particular walking advertisement from the Walking Advertisement screen (as shown, for example, in FIG. 24), the dealer referral and rewards service shows all of the user's clients that the selected walking advertisements has referred to the user. The service queries the database of the back-end system to determine the list of clients that the selected walking advertisement has referred.

FIG. 26 depicts an example of a dealer user's Add a Walking Advertisement screen. The example shown is just one example, and the functionality described herein may be implemented in any graphical format, whether as part of a mobile application or as part of a web-based user interface.

Referring to FIG. 26, the user may input a person's name, email address, and phone number into the dealer referral and rewards service to add that person as a Walking Advertisement. The service stores that person's information in the database of the back-end system, and if the person is not already a user of the service, the back-end system will generate and send an invite to the person inviting them to become a user by creating an account within the service. Once the person is a user of the service (either because they already were a user, or because they signed up for the service in response to the invite), the service links the user to the newly added walking advertisement by updating the database of the back-end system to reflect a link between the user and the newly added walking advertisement.

Figures 27, 28:
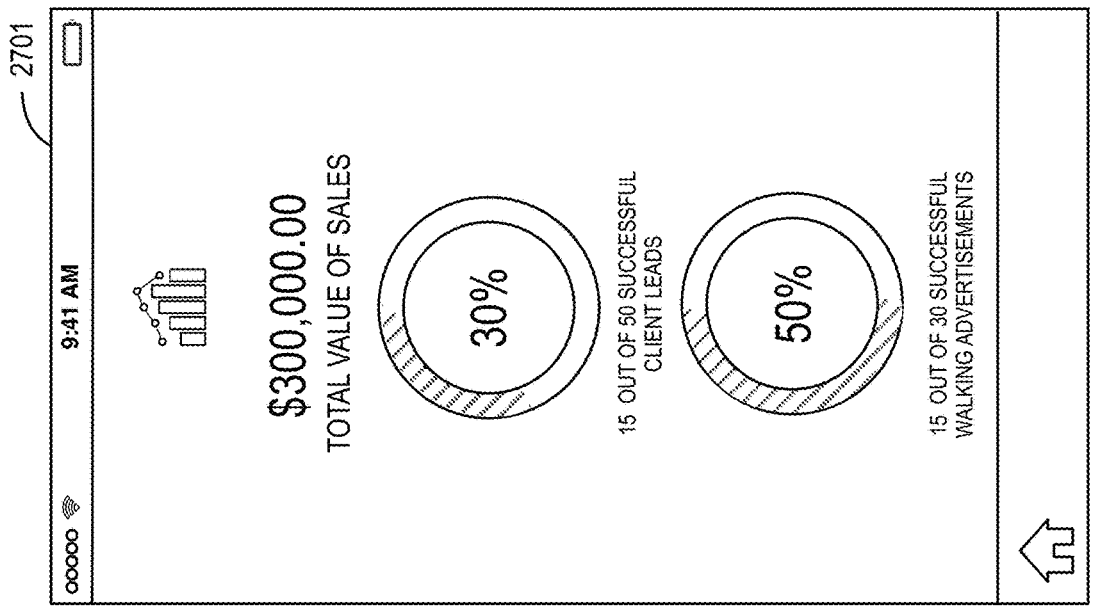
FIG. 27 depicts a dealer user's Results screen on the mobile application of the dealer referral and rewards service.
FIG. 28 depicts an example of a dealer user's screen for the user to submit a vehicle sold on the mobile application of the dealer referral and rewards service.

FIG. 27 depicts a dealer user's Results screen on the mobile application of the dealer referral and rewards service. The example shown is just one example, and the functionality described herein may be implemented in any graphical format, whether as part of a mobile application or as part of a web-based user interface.

Referring to FIG. 27, the mobile application shows the user information reflecting results that the user has achieved through the use of the dealer referral and rewards service. In the example shown in FIG. 27, the mobile application shows the total value of sales that the user has made through the service. In addition, as shown in FIG. 27, the mobile application shows the number of successful client leads compared to the total number of client leads. Similarly, as shown in FIG. 27, the mobile application shows the number of successful walking advertisements compared to the total number of walking advertisements. The mobile application queries the database to determine the specifics of the information being displayed on the user's Results page. For example, the mobile application may query the database for all database entries with the user listed as UserB—Dealer Representative and the Opportunity Status listed as Purchased. From the results of that query, the mobile application or the back-end system may calculate (1) the total number of completed transactions for the user, and (2) the total value of sales for those transactions, using, for example, the Vehicle Purchase Price information.

FIG. 28 depicts an example of a dealer user's screen for the user to submit a vehicle sold on the mobile application of the dealer referral and rewards service. The example shown is just one example, and the functionality described herein may be implemented in any graphical format, whether as part of a mobile application or as part of a web-based user interface.

As explained in the context of FIG. 6, the dealer referral and rewards service verifies that a vehicle has been purchased before providing a reward to the referring user. The verification process involves receiving confirmation from the purchasing user, the dealer, and the partner dealership that the purchase has occurred. As such, the service includes functionality that allows a dealer user to input an automobile purchase that the service uses as verification. The mobile application allows a dealer user to manually input one or more automobiles that the user has previously sold to a client. In the example shown in FIG. 28, the mobile application may provide a drop-down box that allows a dealer user to select the client that the vehicle was sold to. In some embodiments, the mobile application automatically populates the drop-down box using information stored in the database of the back-end system. For example, the mobile application automatically populates the client drop-down box with a list of clients with whom the dealer user has an established link. When the dealer user selects a client, the mobile application automatically populates the box for the identification number from the database of the back-end system. In many instances, the selected client will only have one vehicle stored in the database, and in those cases, the mobile application automatically populates the VIN box. If the selected client has more than one vehicle stored in the database, the mobile application automatically populates the VIN box with all the vehicles that a package offer has been sent to the user for. If there are more than one possible sold vehicles for the selected client, the mobile application provides the user the option to select the correct vehicle that was sold to the client. As with the other boxes, the mobile application automatically populates the fields in response to the user's selections using information from the database of the back-end system.

When the dealer user enters their vehicle sale through the mobile application as described above, the back-end system of the dealer referral and rewards service updates the status of the link between the dealer and the client (e.g., referral lead) to "pending" status within the database and sends a notification to the referring user indicating that an award is pending.

FIG. 29 depicts an example of a user's Settings screen on the mobile application of the dealer referral and rewards service. The example shown is just one example, and the functionality described herein may be implemented in any graphical format, whether as part of a mobile application or as part of a web-based user interface.

The dealer referral and rewards service allows a user to update their settings for the service and/or the mobile application via the Settings screen, as shown in FIG. 29. The Settings screen may include a button that allows the user to update their user profile. It may further include a button that allows the user to contact the dealer referral and rewards service. It may further include a button that allows the user to see an About Us screen that contains information about the dealer referral and rewards service.

Figure 30:
FIG. 30 depicts an example of a user's Update Your Profile screen on the mobile application of the dealer referral and rewards service.

FIG. 30 depicts an example of a user's Update Your Profile screen on the mobile application of the dealer referral and rewards service. The example shown is just one example, and the functionality described herein may be implemented in any graphical format, whether as part of a mobile application or as part of a web-based user interface. The dealer referral and rewards service allows the user to update one or more fields, such as, for example, the user's email address, the user's phone number, or the user's password via the Update Your Profile screen, as shown in FIG. 30. The Update Your Profile screen allows the user to update some or all of these pieces of information, and the service stores the updated information in the database of the back-end system.

Figures 31, 32:
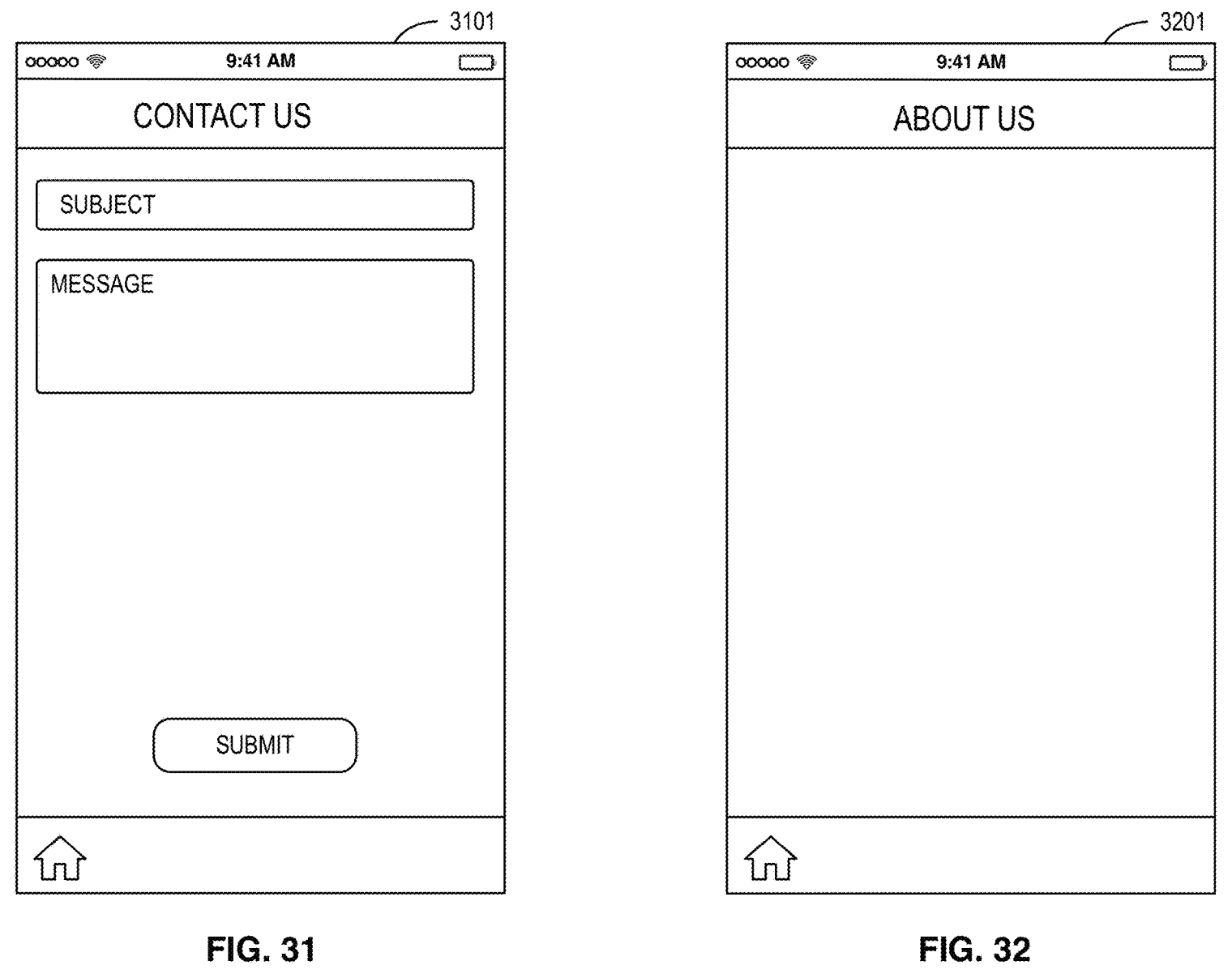

FIG. 31 depicts an example of a user's Contact Us screen on the mobile application of the dealer referral and rewards service. The example shown is just one example, and the functionality described herein may be implemented in any graphical format, whether as part of a mobile application or as part of a web-based user interface. The dealer referral and rewards service allows users to contact the provider of the service via the Contact Us screen, as shown in FIG. 31. The Contact Us screen allows a user to enter a message that the mobile application sends directly to the dealer referral and rewards service. The Contact Us screen further allows a user to call customer service of the dealer referral and rewards service.

FIG. 32 depicts an example of a user's About Us screen on the mobile application of the dealer referral and rewards service. The example shown is just one example, and the functionality described herein may be implemented in any graphical format, whether as part of a mobile application or as part of a web-based user interface. The dealer referral and rewards service provides information about the service to the user via the About Us screen.

The exemplary screen of the mobile application shown in FIGS. 9-32 use information from the database to populate the information shown in the screen. The mobile application or the back-end system may perform various database queries and/or calculations to generate the information displayed on the mobile application screen.

Figure 33:
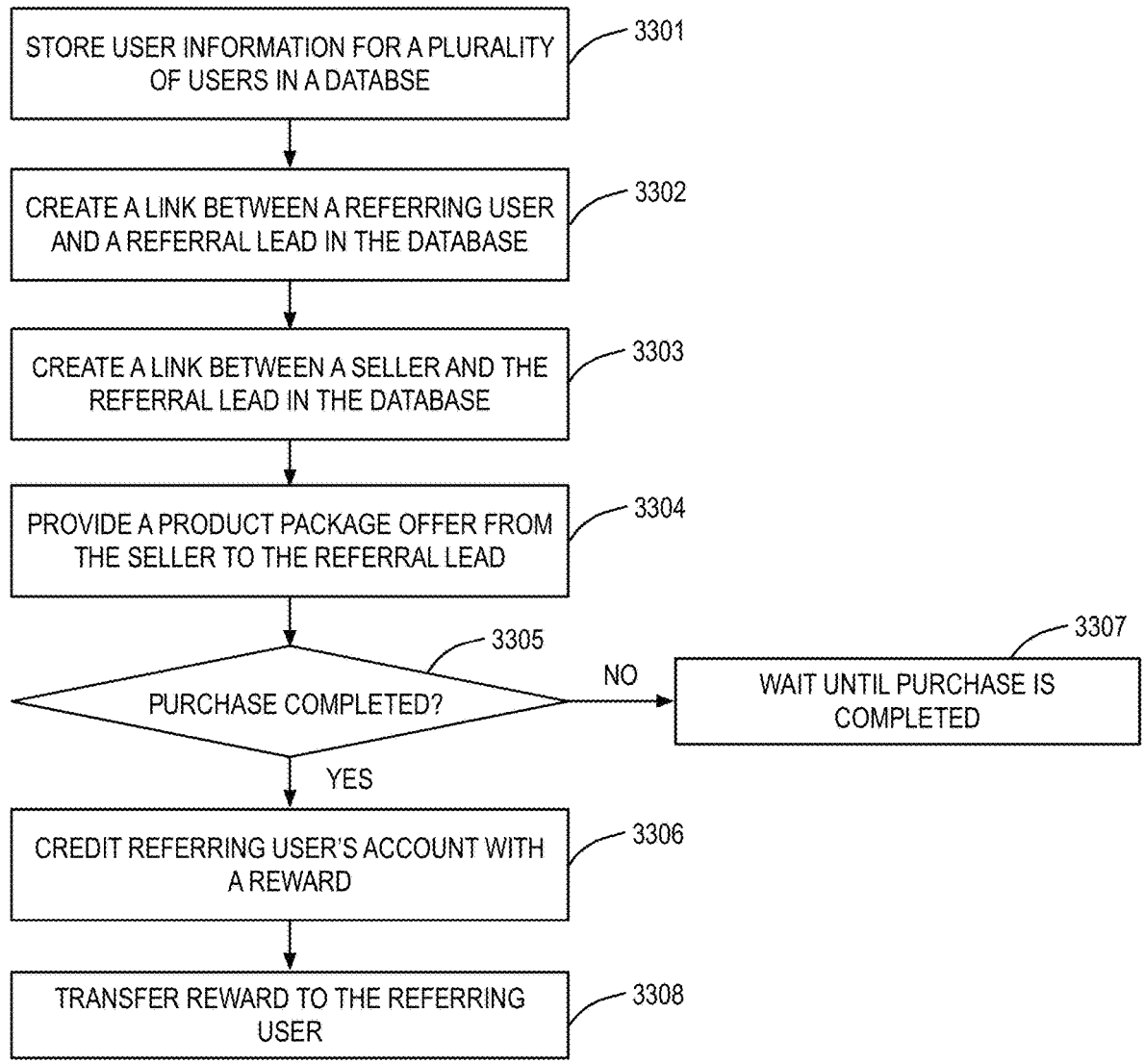
FIG. 33 depicts a method for managing referrals and rewards for automobile sales in accordance with the present disclosure.

FIG. 33 depicts a method for managing referrals and rewards for automobile sales in accordance with the present disclosure.

Referring to FIG. 33, at step 3301, user information for a plurality of users is stored in a database. As described above, the plurality of users includes users that are automobile buyers and users that are automobile sellers.

At step 3302, a link is created between two users that are potential buyers. As explained above, a referring user may create a link with a referral lead (for example, if the referral lead is looking for a recommendation for a dealer to buy a car from). The link between the referring user and the referral lead is stored in the database as an association between the users. The association is added to the user information for each of the linked users (e.g., the referring user and the referral lead).

At step 3303, a link is created between a user that is a potential buyer and a user that is a seller. As explained above, the referring user may suggest a link between the referral lead and the seller. The link between the referral lead and the seller is stored in the database as an association between the users. The association is added to the user information for each of the linked users (e.g., the referral lead and the seller).

At step 3304, a product package offer from the seller is provided to the referral lead (i.e., the potential buyer). As explained above, the product package offer includes information associated with an automobile for sale and a purchase price for the automobile. It may include other information, such as payment/financing/leasing details, and out-the-door price, as explained in detail above.

At step 3305, a check is performed to determine whether a purchase of an automobile has been completed. The check to determine whether a purchase has been completed may be performed using the three-step verification described in the context of FIG. 6. The verification process may include receiving a verification of the purchase from the first user, receiving a verification of the purchase from the third user, and receiving a verification of the purchase from an automobile dealership from which the purchase was made. If the purchase has not been completed, then the method waits until the purchase has been completed, at step 3307.

If the purchase has been completed, the method moves on to step 3306. At step 3306 (i.e., upon completion of a purchase of the automobile), the referring user's account is credited with a reward. The reward is credited to the account by storing the reward in the database as part of the user information associated with the referring user.

At step 3308, the reward is transferred to the referring user. The reward may be transferred to the referring user upon request by the referring user. In this way, the referring user may allow rewards to accumulate in their account and be paid out whenever they choose, upon request. As explained above, the reward may be sent to the referring user as a check or using an ACH or other type of electronic transfer.

As mentioned above, some embodiments of the dealer referral and rewards service include an integrated shopping functionality that allows the user to browse and/or search the inventory of a selected dealership. The service may allow the user to search, sort, and filter the dealership's inventory to find particular automobiles they may be interested in. The back-end system of the dealer referral and rewards service may be integrated with a dealership's website and/or inventory database, which allows the back-end system to access the dealership's available inventory in real-time. If the user sees any cars they are interested in in the dealership's available inventory, the user may click on a button on the Shop screen to add that car to the user's personal inventory. In one embodiment, when the user adds a car to the user's personal inventory, the user's connected dealer for that dealership is sent a notification letting them know that the user has added that car to their personal inventory.

In embodiments where the dealer referral and rewards service is integrated into the dealership's inventory system and/or website, the back-end system of the service may be configured to monitor the dealership's inventory (through its connection to the dealership's website), and if an automobile in a user's personal inventory no longer appears in the dealership's inventory (e.g., because it has been sold or transferred to another dealership, etc.), then the back-end system sends a notification to the user to let the user know that the particular car may no longer be available, such that the user can follow-up with the dealer to find out what happened to the car and/or remove the car from the user's personal inventory. In some embodiments, the back-end system automatically removes the car from the user's personal inventory in addition to sending the notification.

In some embodiments, when a user is browsing a dealership's inventory, the dealer referral and rewards service provides the user the ability to make an offer on a particular vehicle. When the user selects to make an offer, the app presents the user with a screen where the user may enter a final, out-the-door offered price for the vehicle. In addition, the screen may include a "Notes" field where the user can enter any other information relevant to their offer. The service transmits this information to the back-end system, which stores the offer and sends a notification to the dealer that an offer has been received.

As shown in multiple of the figures discussed above, the mobile application may include one or more navigation buttons in addition to the functionality shown in the figures. For example, the figures show a Home button at the bottom of the screens of the mobile application that allows the user to return to the User Home screen from wherever they are within the mobile application.

The systems and methods described herein may be implemented using commercially available devices, such as, for example, cellular phones (e.g., Apple iPhone, Android devices) and network-enabled devices (e.g., desktop computer, laptop computer, tablets, netbooks, 2-in-1 computers, etc.).

It will be appreciated that that systems and methods described herein may be implemented using various types of user interfaces, such as user interfaces that allow the users to log in and update their profile, availability, etc. For example, as explained above, the user interface may be implemented in a mobile app, or on a web browser.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby®, JavaScript®, Java®, Python®, PHP, C, C++, C#, Objective-C®, Go®, Scala®, Swift®, Kotlin®, OCaml®, or the like. The program code may execute entirely on the user's computer, partly on the user's computer, as a stand-alone software package, partly on the user's computer, and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method residing within a back-end system for decreasing an amount of time and a number of communications required in a process of a purchase of an automobile for sale, comprising:
    storing, in a database, user information associated with a plurality of users, wherein:
        the plurality of users includes users of a first type and users of a second type;
        the first type is a potential automobile buyer; and
        the second type is an automobile seller;
    creating a first link via the back-end system between a first software application on a first mobile device of a first user and a second software application on a second mobile device of a second user,
        wherein the first user and the second user are users of the first type, wherein the first software application is configured to facilitate a purchase of the automobile, and wherein the first link is represented as an association in the database that is stored as part of the user information associated with the first user and stored as part of the user information associated with the second user;

creating a second link via the back-end system between the first software application and a third software application on a computing device of a third user based at least partially on a location determined by GPS circuitry of the first mobile device and an amount of time since receiving communication with the second software application, wherein the third user is a user of the second type, wherein the second link is represented as an association in the database stored as part of the user information associated with the first user and stored as part of the user information associated with the third user, and wherein the second link is a referral link and is created in response to a suggestion from the second user;

providing, via electronic transmission, the first user with a product package offer from the third user, wherein the product package offer includes information associated with the automobile, a purchase price for the automobile, and complete paperwork for completion of a purchase of the automobile by the first user;

upon completion of a purchase of the automobile by the first user, crediting an account of the second user with a reward, wherein the account is credited by storing the reward in the database as part of the user information associated with the second user; and transferring the reward to the second user.

2. The method of claim 1, wherein the reward is transferred to the second user upon a request of the second user.

3. The method of claim 1, wherein the reward is transferred to the second user using an ACH transfer.

4. The method of claim 1, wherein:

the completion of the purchase of the automobile is verified using a verification process that includes receiving a verification of the purchase from the first user, receiving a verification of the purchase from the third user, and receiving a verification of the purchase from an automobile dealership from which the purchase was made; and generating a bill to the automobile dealership for providing the second link.

5. The method of claim 1, further comprising hosting a communication channel between the first user and the third user to allow communication between the first user and the third user, wherein the communication channel is established using the user information associated with the first user and the user information associated with the third user.

6. A server residing within a back-end system for decreasing an amount of time and a number of communications required in a process of a purchase of an automobile for sale, comprising:

a database configured to store user information associated with a plurality of users, the plurality of users including users of a first type and users of a second type, wherein the first type is a potential automobile buyer and the second type is an automobile seller; and a processor configured to:

create a first link via the back-end system between a first software application on a first mobile device of a first user and a second software application on a second mobile device of a second user, wherein the first user and the second user are users of the first type, wherein the first software application is configured to facilitate a purchase of the automobile, and wherein the first link is represented as an association in the database that is stored as part of the user information associated with the first user and stored as part of the user information associated with the second user;

create a second link via the back-end system between the first software application and a third software application on a computing device of a third user based at least partially on a location determined by GPS circuitry of the first mobile device and an amount of time since receiving communication with the second software application, wherein the third user is a user of the second type, wherein the second link is represented as an association in the database stored as part of the user information associated with the first user and stored as part of the user information associated with the third user, and wherein the second link is a referral link and is created in response to a suggestion from the second user;

provide, via electronic transmission, the first user with a product package offer from the third user, wherein the product package offer includes information associated with the automobile, a purchase price for the automobile, and complete paperwork for completion of a purchase of the automobile by the first user;

upon completion of the purchase of the automobile by the first user, credit an account of the second user with a reward, wherein the account is credited by storing the reward in the database as part of the user information associated with the second user; and transfer the reward to the second user.

7. The server of claim 6, further comprising a messaging service that hosts a communication channel between users that allows communication between the first user and the third user, wherein the communication channel is established using the user information associated with the first user and the user information associated with the third user.

8. The server of claim 7, further comprising an image and video management service.

9. The server of claim 6, wherein the reward is transferred to the second user using an ACH transfer.

10. The server of claim 6, wherein the processor is further configured to:

verify completion of the purchase of the automobile using a verification process that includes receiving a verification of the purchase from the first user, receiving a verification of the purchase from the third user, and receiving a verification of the purchase from an automobile dealership from which the purchase was made; and generating a bill to the automobile dealership for providing the second link.

11. A system for decreasing an amount of time and a number of communications required in a process of a purchase of an automobile for sale, comprising:

a first software application operable on a first mobile device of a first user and configured to facilitate the purchase of an automobile, wherein the first user is a user of a first type and the first type is a potential automobile buyer;

a second software application operable on a second mobile device of a second user, wherein the second user is a user of the first type;

a third software application operable on a computing device of a third user, wherein the third user is a user of a second type and the second type is an automobile seller;

a server within a back-end system, wherein the server comprises a processor configured to:

store, in a database, user information associated with a plurality of users, wherein the plurality of users includes users of the first type and users of the second type;

create a first link via the back-end system between the first software application of the first user and on the second software application of the second user, wherein the first link is represented as an association in the database that is stored as part of the user information associated with the first user and stored as part of the user information associated with the second user;

create a second link via the back-end system between the first software application of the first user and the third software application of the third user based at least partially on a location determined by GPS circuitry of the first mobile device and an amount of time since receiving communication with the second software application, wherein the second link is represented as an association in the database stored as part of the user information associated with the first user and stored as part of the user information associated with the third user, and wherein the second link is a referral link and is created in response to a suggestion from the second user;

provide, via electronic transmission, the first user with a product package offer from the third user, wherein the product package offer includes information associated with the automobile, a purchase price for the automobile, and complete paperwork for completion of a purchase of the automobile by the first user;

upon completion of the purchase of the automobile by the first user, credit an account of the second user with a reward, wherein the account is credited by storing the reward in the database as part of the user information associated with the second user; and transfer the reward to the second user.

12. The server of claim 11, wherein the reward is transferred using an ACH transfer.

13. The server of claim 11, wherein the processor of the server is further configured to:

verify completion of the purchase of the automobile using a verification process that includes receiving a verification of the purchase from the first user, receiving a verification of the purchase from the third user, and receiving a verification of the purchase from a dealership from which the purchase was made; and generating a bill to the automobile dealership for providing the second link.

14. The server of claim 11, wherein the processor of the server is further configured to host a communication channel between the first user and the third user to allow communication between the first user and the third user, wherein the communication channel is established using the user information associated with the first user and the user information associated with the third user.

\* \* \* \* \*